US010573077B2

(12) United States Patent
Wagner et al.

(10) Patent No.: US 10,573,077 B2
(45) Date of Patent: Feb. 25, 2020

(54) SMART MIRROR FOR LOCATION-BASED AUGMENTED REALITY

(71) Applicant: The Matilda Hotel, LLC, New York, NY (US)

(72) Inventors: Melanie Wagner, New York, NY (US); Andrew Braverman, New York, NY (US); Garett Chang, New York, NY (US); Andre D. Smith, New York, NY (US); Michael Gabinsky, New York, NY (US)

(73) Assignee: The Matilda Hotel, LLC, New York, NY (US)

( * ) Notice: Subject to any disclaimer, the term of this patent is extended or adjusted under 35 U.S.C. 154(b) by 0 days.

(21) Appl. No.: 15/910,209

(22) Filed: Mar. 2, 2018

(65) Prior Publication Data
US 2019/0272675 A1 Sep. 5, 2019

(51) Int. Cl.
*G06T 19/00* (2011.01)
*H04N 5/225* (2006.01)
*H04N 13/204* (2018.01)
*H04N 13/293* (2018.01)
*H04L 29/08* (2006.01)

(52) U.S. Cl.
CPC ......... *G06T 19/006* (2013.01); *H04N 5/2257* (2013.01); *H04N 13/204* (2018.05); *H04N 13/293* (2018.05); *H04L 67/10* (2013.01)

(58) Field of Classification Search
None
See application file for complete search history.

(56) References Cited

U.S. PATENT DOCUMENTS

| 10,052,026 | B1* | 8/2018 | Tran | G16H 50/30 |
| 2007/0040033 | A1* | 2/2007 | Rosenberg | A47G 1/02 235/462.36 |
| 2008/0174682 | A1* | 7/2008 | Faisman | G06T 11/00 348/239 |
| 2009/0216659 | A1* | 8/2009 | Parker | G06Q 30/06 705/26.1 |
| 2013/0145272 | A1* | 6/2013 | Boggie | G06F 3/0487 715/728 |
| 2013/0170715 | A1* | 7/2013 | Reed | G06F 17/5009 382/111 |
| 2013/0229482 | A1 | 9/2013 | Vilcovsky | |

(Continued)

FOREIGN PATENT DOCUMENTS

JP 2014013460 A 1/2014

*Primary Examiner* — Jason A Pringle-Parker
(74) *Attorney, Agent, or Firm* — Troutman Sanders LLP

(57) ABSTRACT

Methods and systems for providing smart mirrors and smart mirror systems for mixed or augmented reality display are disclosed. A system for augmented reality display using a smart mirror system comprises a server and a smart mirror. The smart mirror comprises a display and a camera. The server is configured to receive information associated with a user; identify, using the information, an object for the user; and transmit, to the smart mirror a three-dimensional model of the object. The smart mirror is configured to receive, from the server, the three-dimensional model of the object; receive, from the camera, a real-time image of the user; overlay the three-dimensional model of the object on the real-time image of the user to provide an overlaid image; and display the overlaid image on the display.

11 Claims, 14 Drawing Sheets

(56) References Cited

U.S. PATENT DOCUMENTS

2015/0145671 A1\* 5/2015 Cohen .................... G08B 21/18
340/539.11
2016/0292917 A1 10/2016 Dorner et al.

\* cited by examiner

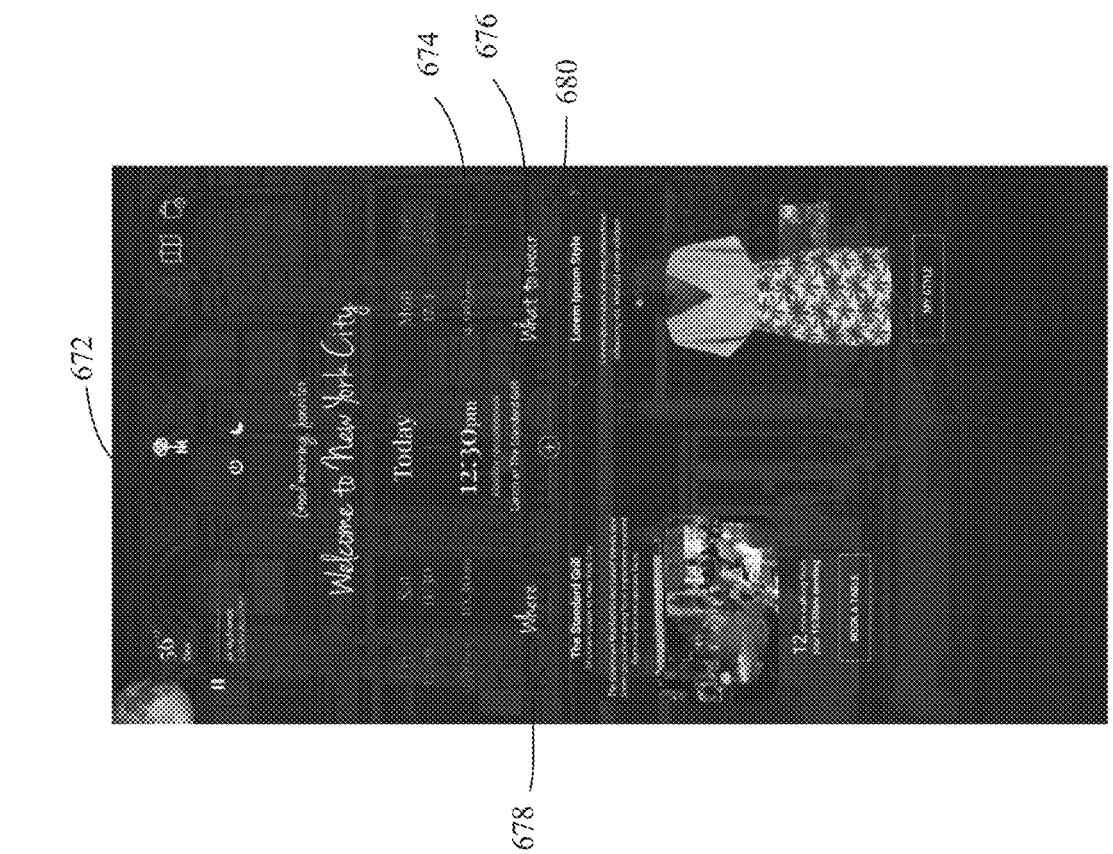
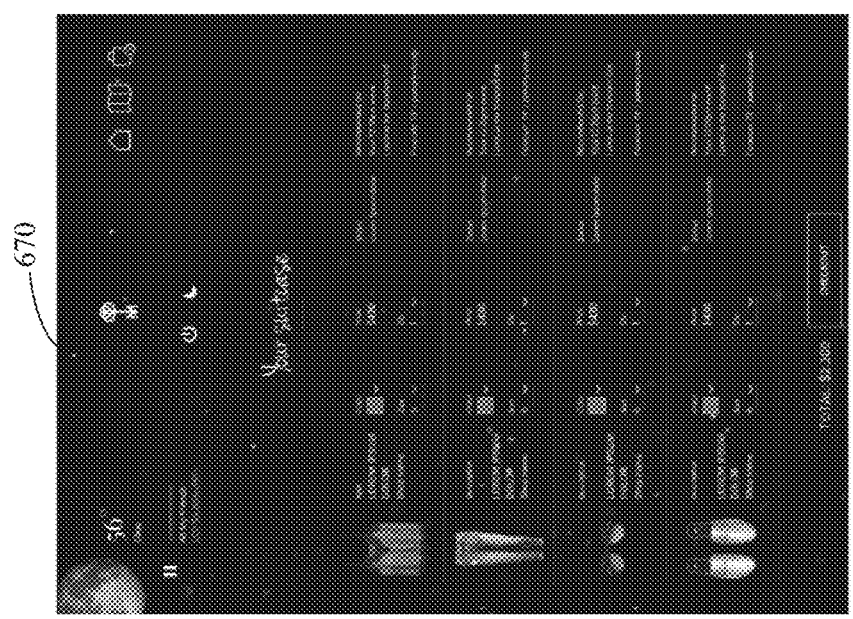
FIG. 6D

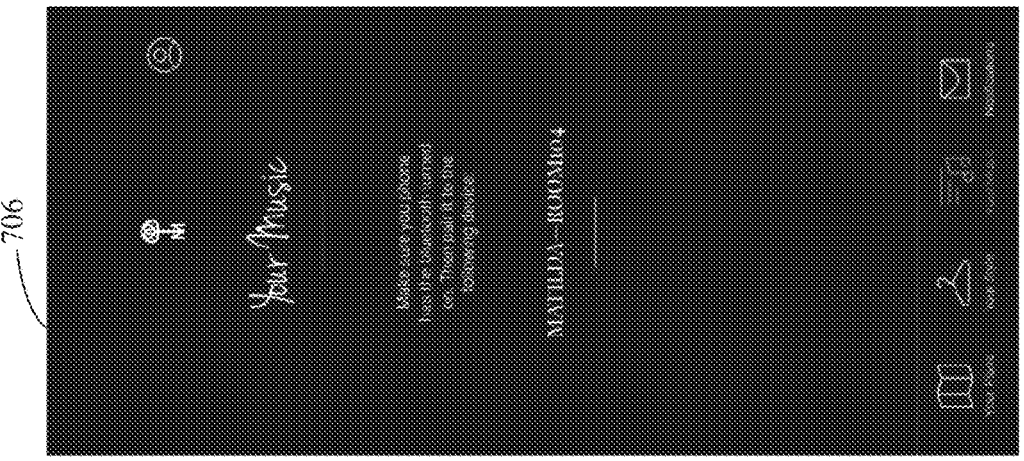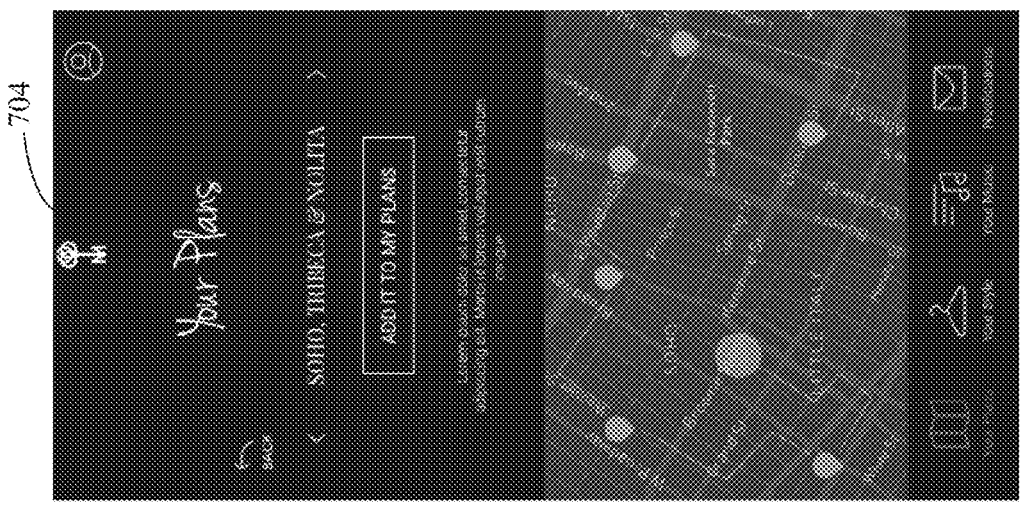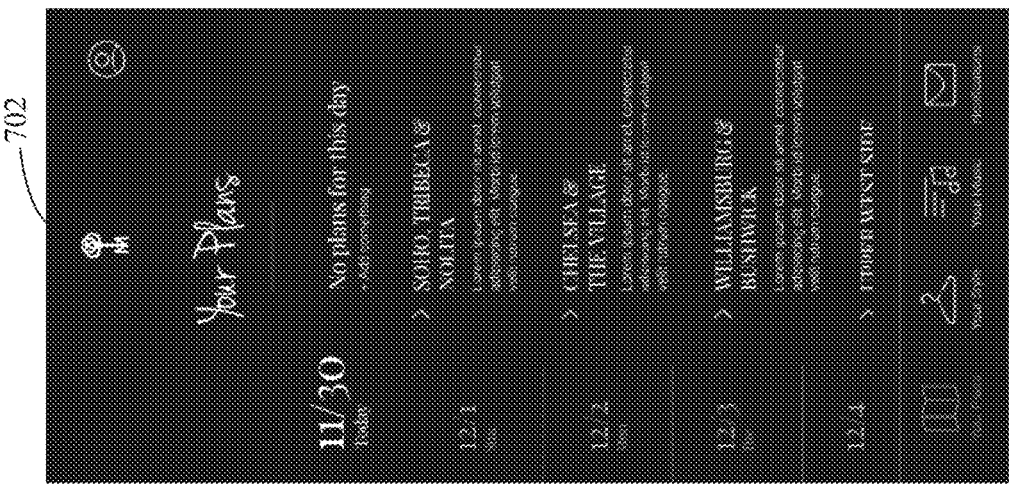
FIG. 7

SMART MIRROR FOR LOCATION-BASED AUGMENTED REALITY

TECHNICAL FIELD

This disclosure relates generally to an internet-of-things (IoT) device and more specifically to a smart mirror.

BACKGROUND

Products and persons can have two separate presences: a physical presence and a digital presence. For example, a product's digital presence includes CAD designs, simulation results, and the like. The product's physical presence starts when it is manufactured. While the product's digital presence can be used, for example, to analyze failures of the product in the real (i.e., physical) world, the two presences (i.e., digital and physical) have not intermixed. Similarly, a person's digital presence can include events stored in digital calendars and cloud-stored profiles and/or preferences that can be used, for example, to affect the person's physical presence. However, there has not been an intermixing of the person's digital and physical presences.

SUMMARY

Disclosed herein are implementations of a smart mirror and a smart mirror system.

A first aspect is a system for augmented reality display using a smart mirror system. The smart mirror system includes a server and a smart mirror. The smart mirror includes a display and a stereoscopic camera. The server is configured to receive information associated with a user, identify, using the information, an object for the user, and transmit, to the smart mirror, a three-dimensional model of the object. The smart mirror is configured to receive, from the server, the three-dimensional model of the object, receive, from the stereoscopic camera, a real-time image of the user, overlay the three-dimensional model of the object on the real-time image of the user to produce an overlaid image, and display the overlaid image on the display.

A second aspect is a smart mirror for augmented reality. The smart mirror includes a mirror having a silvered side and a reflective side, a display parallelly disposed on the silvered side, a camera disposed on the silvered side, a control unit configured to execute instructions for performing the augmented reality, and an enclosure for enclosing the mirror, the display, the camera, and the control unit. The camera configured to capture stereoscopic images and comprising two or more lenses. The control unit disposed on the silvered side adjacent the camera.

A third aspect is a smart mirror for augmented reality including an enclosure and a pod. The enclosure comprises a mirror having a silvered side and a reflective side and a display parallelly disposed on the silvered side. The pod comprises a camera configured to stereoscopic images, the camera comprising two or more lenses. The pod further comprises a control unit configured to execute instructions for performing the augmented reality displayable on the display.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 6A-6D are screenshots of an example of a flow of an application that uses a smart mirror according to implementations of this disclosure.

FIG. 7 are screenshots of an example of a companion application of a smart mirror according to implementations of this disclosure.

DETAILED DESCRIPTION

Figure 1:
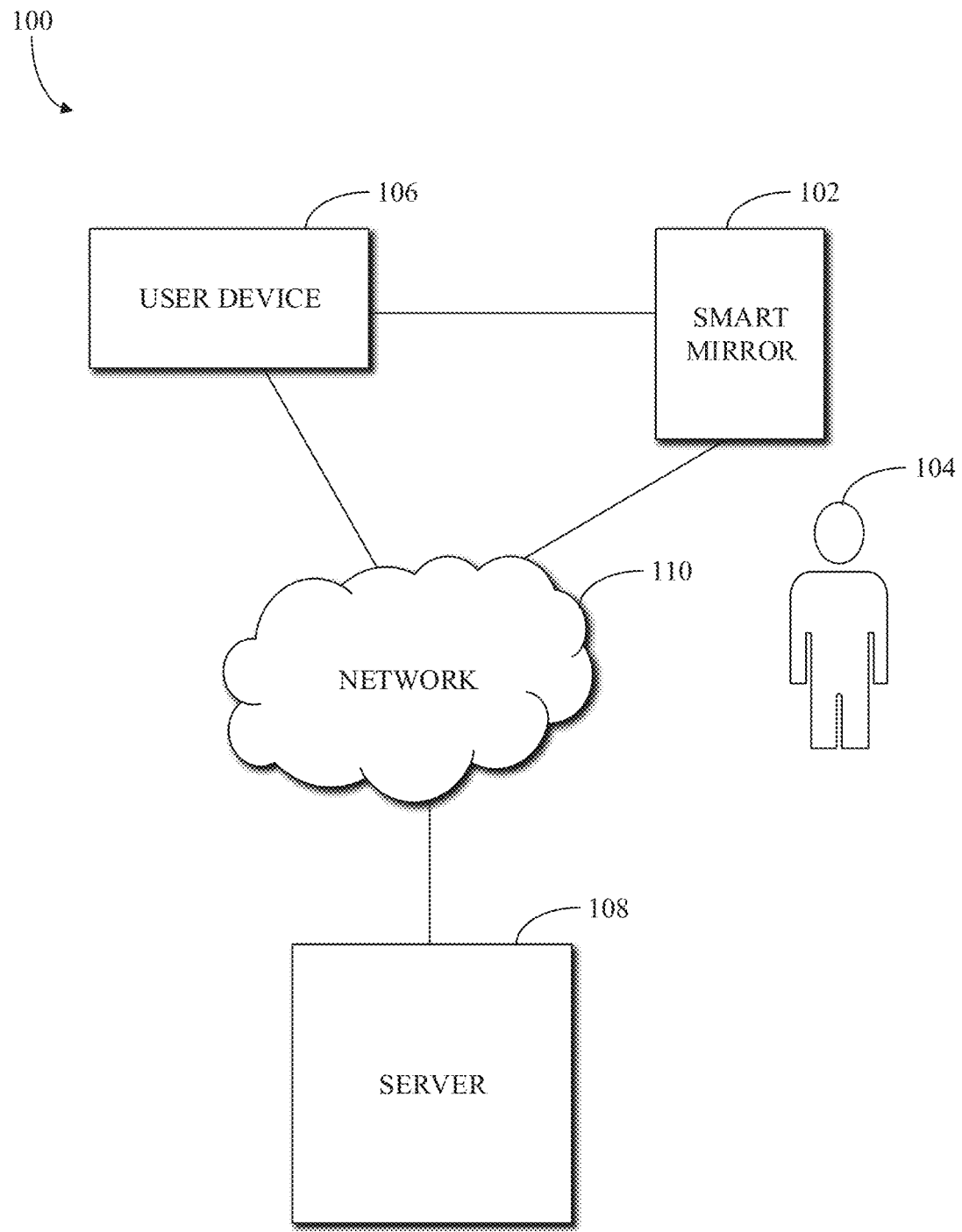
FIG. 1 is an example of a high-level block diagram of a smart mirror system for using a smart-mirror according to implementations of this disclosure.

Not all countries, cities, or even areas or neighborhoods of cities are alike. Each can have its own culture, style, and ambiance. Travelers (i.e., business or leisure travelers) from one country/city may find themselves in an unfamiliar country/city. A traveler (and, in general, a user of a smart mirror system, smart mirror devices, and methods disclosed herein, also is referred to as a user or Guest) may feel uncomfortable in business meetings or walking the streets of a city because it may be clear that the user does not "fit" and does not belong. On the other hand, it can be a daunting task for a traveler to try to learn or match the style of a destination city. While the traveler may perform internet searches, read about the destination city, and review online images of the people of the destination city, the user may still misinterpret or fail to capture the essence or style of the destination city.

Implementations according to this disclosure can use known information about or inputs associated with a user to provide recommendations via a smart mirror system to the user regarding a destination city. For example, the information known about the user can include the daily itinerary of the user. The itinerary can be extracted, for example, from the user's calendar(s). For example, the calendar can include a business meeting at a particular address and/or an after-work social dinner with colleagues at a particular venue. Alternatively, the user can provide the particular addresses or venues and other user-submitted information. The addresses or venues can be used to determine the vibe or style of the areas of the particular addresses or venue to provide fashion recommendations. In some examples, the addresses or venues can be used in combination with other inputs. For example, a weighted algorithm of many inputs can be used to provide recommendations to the user. For example, the recommendations can include product recommendations or other types of recommendations (e.g., things to do in the city). For example, the recommendations can include actions that the user can perform/initiate. In an example, the additional inputs can include one or more of weather information, event information, neighborhood information, the user's browsing history, the user's social media profiles or more or less inputs.

As such, the recommendations are based on what is known about the user. A profile of the user's preferences need not be pre-built in order to determine recommendations. Traditionally, a user profile, which can be based on the user answering a lengthy overwhelming questionnaire, is used in order to provide recommendations. Traditionally, recommendations are adapted to the user (e.g., "tell us what you like, and we'll make recommendations accordingly."). However, according to implementations of this disclosure, the user is provided recommendations to help adapt and get acclimated to the destination (e.g., "for your dinner at the Tribeca area of New York, here's how you should dress."). While a user is not asked upfront about his or her preferences, as preferences become known or learned or even user-submitted, they can be used to make recommendations using machine learning techniques.

The user can try on, in a three-dimensional mixed-reality (also referred to as an augmented reality) environment, one or more of the fashion recommendations (e.g., outfit for the day) and order the desired ones from related sources (e.g., department stores). The user can try on the recommendations while at a hotel room in the destination city. Accordingly, the orders based on the recommendations can be delivered directly to the user's hotel room. In another scenario, the user can try on the recommendations before arriving at the hotel room and the ordered recommendations can be available in the hotel room when the user arrives.

Implementations according to this disclosure can be used to bring products and merchants closer to a user, such as a business traveler or a leisure traveler. The user gains time that the user would otherwise use looking for products. While retailers may have online stores, users may be reluctant to buy from such stores because of concerns over fit and size. That is, users would prefer to try an outfit on before buying. Such retailers may also have traditional show rooms where users spend only minutes. Retailers recognize that they need to have a physical presence (e.g., a store) in addition to their digital presence (e.g., online store). Additionally, a user may not have the time to find a retail store and an appropriate item; and even when searching online, the user may not have sufficient time to order and receive the item. That a user can be checked into a hotel for a long duration, e.g., 24 hours, provides an opportunity of having access to the user for such long duration because a user can try on any clothes (as if the user was at the store for the 24 hours) while having the convenience of an online shopping experience (e.g., shopping anytime and from anywhere).

Implementations according to this disclosure can provide a user with relevant information that combine digital information about the user with the physical person or physical location of a user in a mixed-reality or augmented reality environment.

Smart mirrors and systems according to this disclosure can be used to create mixed reality ecosystems. The real world (i.e., the physical environment) of a user can be mixed with the digital world to provide enhanced capabilities to the user by personalizing, adapting, or supplementing products, data, and the user's environment to the needs of the user. The personalized experience can be localized to a particular emotional vibe or neighborhood or event in the user's life, and overall journey. Algorithms according to implementations of this disclosure can help users with their present and future needs so that the user can be fully and effortlessly immersed in his or her environment. A user need not have to use his or her mind, energy, time, and/or effort to plan and coordinate.

FIG. 1 is an example of a high-level block diagram of a smart mirror system 100 for using a smart-mirror according to implementations of this disclosure. FIG. 1 illustrates a smart mirror 102, a user 104, a user device 106, a server 108, and a network 110. The user 104 can be the user of the smart mirror. That is, the user 104 is the person that stands in front of the smart mirror 102 and uses the features of the smart mirror 102 and/or to whom the features of the smart mirror 102 can be applied. For example, the smart mirror 102 can display a mashup of the activities of the user 104 for a given time duration (e.g., day, week, etc.). For example, the smart mirror 102 can be used to overlay a three-dimensional (also referred to as a 3-dimensional) outfit onto the user 104 for the user 104 to see and interact with while standing in front of the smart mirror 102. Overlaying the 3-dimensional outfit onto the user 104 means to overlay the outfit on a real-time image of the user.

The smart mirror 102 can be available at any physical location. For example, the smart mirror 102 can be available at a private location, a semi-private location, or a public location. The private location can be, for example, a bedroom, a bathroom, or any other room of the private residence of the user 104. The semi-private location can be, for example, a hotel room into which the user 104 is checked into or staying at. While checked into the hotel room, the user 104 can use the smart mirror 102. However, the next guest at the same hotel room can become the user of the same smart mirror 102. The public location can be, for example, a hotel lobby, a brick-and-mortal store at a mall, a kiosk at a public event, and/or any other public place.

The user device 106 can be a computing device of the user 104. For example, the user device 106 can be tablet, a phablet, a smart phone, a desktop computer, a laptop, or any like device capable of at least one of executing instruction, receiving executable instructions, displaying an output, and/or receiving an input, such as receiving instructions from the user 104. The user device 106 can include instructions (e.g., in the form of an application) executable by the user device 106 as a companion application to the smart mirror 102. The user device 106 can communicate with the smart mirror 102 via, for example, Bluetooth, WiFi, cellular, and other available communication protocols.

The server 108 can be implemented using one or more server computers. As used herein, the term "server computer" means any computing device that can receive a request from another computing device and transmit a response to the request and/or any computing device capable of storing and executing instructions.

For example, based on identifying the user 104 and upon receiving a request from the user 104 for recommendations (such as fashion recommendations), the server 108 can provide the one or more fashion recommendations to the smart mirror 102 via the network 110. The user 104 can use the smart mirror 102 to try-on one or more of the fashion recommendations. The user 104 can transmit a request, via the smart mirror 102 and/or the user device 106, to the server 108 to request delivery of one of the fashion recommendations (e.g., delivery to the hotel room or their residence).

The server 108 can include preference information (e.g., a profile) associated with the user 104. For example, the server 108 can include user preferences that a service or product provider can use to enhance an experience of the user. The preference information can be organized by service type, by product type, by provider, or other organizations. The preference information can be provided by the user by entering the information via the user device 106. The server 108 can supplement the preference information with information extracted based on interactions of the user 104 with the smart mirror 102 and/or the user device 106.

For example, the preference information can include preferences that a hotelier can use to enhance a stay of the user 104 at a hotel. The preference information can be used as a tool, a channel, or blackbook to enhance the user's stay. For example, the preference information can include the user's food preferences, in-room lighting preferences, mattress firmness preferences, comforter fluffiness preferences, and the like. The preference information can be used by the hotelier to provide the user with a room that matches the user's preferences. For example, upon entry into the room, or proximity of the user to the room, the lighting can be set according to the lighting preferences. Entry into, or proximity to, the room can be detected in any number of ways. In an example, beacons in the hotel can detect the proximity of the user to the room by detecting that the user device 106 is close to the room. Instead of or in addition to beacons, other sensing devices can also be used. Examples of other sensing devices include motion sensors, GPS receivers, and smart (e.g., internet-of-things) door handles.

For example, the preference information can include body-related information. The body-related information can include one or more of body measurements, body shape, body contour, and/or other body details and characteristics of the user 104. For example, the user can provide at least some of the body-related information to the server 108 via an application, a form, or the like that the user 104 uses to provide the body-related information. In another example, the server 108 can learn at least some of the body-related information s of the user based on ordered and retained and/or ordered and returned fashion items. In another example, the body-related information can be determined automatically based on images of the user captured via a stereoscopic camera (or other type of camera or combination of camera devices of the smart mirror 102. The preference information can be used by the server 108 to provide fashion recommendations and sizes to the user 104. In an example, one service provider can use the preference information and/or an identified user to provide information regarding the user to another service provider. For example, when the user checks into a hotel, the hotel can electronically send information regarding the user to a partner restaurant, retailer, or taxi service. For example, the hotel can send to the partner restaurant information regarding the duration of stay of the user.

In an implementation, the smart mirror 102 can include a stereoscopic camera (also referred to as a stereo camera) or other types of cameras. Stereoscopic images of the user 104, taken by the stereoscopic camera, can be transmitted from the smart mirror 102 to the server 108. The server 108 can use the stereoscopic images to determine the anthropometric body measurements of the user 104. The body measurements can be used for providing fashion recommendations that are appropriately sized for the user's body measurements.

The server 108 can supplement the preference information with fashion preferences of the user 104. For example, the server 108 can learn of the user's fashion preferences based on fashion recommendations that the user sees but does not try-on (e.g., un-preferred recommendations) and the fashion recommendations that user sees and does try-on (e.g., liked or preferred recommendations). The server 108 can use the preference information for determining subsequent fashion recommendations.

The smart mirrors, systems, services, servers, and other computing devices described herein are in communication via the network 110. The network 110 can be one or more communications networks of any suitable type in any combination, including wireless networks, wired networks, local area networks, wide area networks, cellular data networks, satellite-based network, and the internet.

In some implementations, the smart mirror system 100 does not include the user device 106. As such, all input from the user 104 to the smart mirror 102 can be performed via an interface (e.g., touchscreen display) available at the smart mirror 102. In some implementations, the smart mirror system 100 does not include the server 108. For example, the smart mirror 102 can receive profile and other types of information directly from the user device 106. For example, the smart mirror 102 can include the user profile information.

Figure 2:
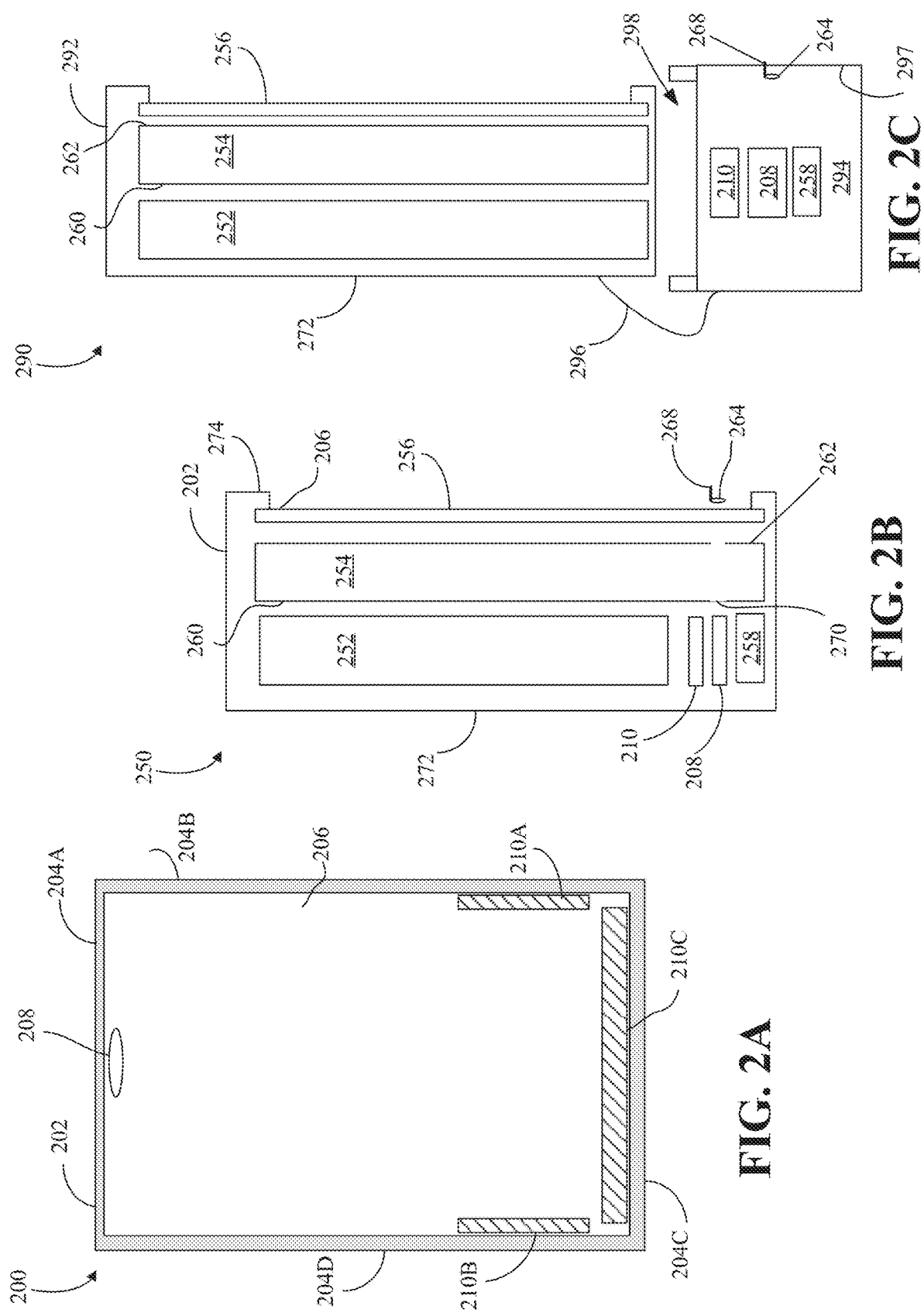
FIG. 2A is an example of a smart mirror according to an implementation of this disclosure.
FIG. 2B is an example of a side view of a smart mirror according to an implementation of this disclosure.
FIG. 2C is an example of a smart mirror with a pod according to an implementation of this disclosure.

FIG. 2A is an example of a smart mirror 200 according to implementations of this disclosure. The smart mirror 200 can be the smart mirror 102 of FIG. 1. The smart mirror 200 includes an enclosure 202, a camera 208, and speakers 210. The smart mirror 200 includes four sides 204 and a front side 206 and a back side (not shown). The front side 206 is a mirrored side. The back side can also be a mirrored side providing a dual-mirrored smart mirror. A user standing in front of the smart mirror 200 can see his or her reflection on the front side 206. Additionally, the user can see information displayed by a display device (described with respect to FIG. 2B) of the smart mirror 200.

From the perspective of the user standing in front of the smart mirror 200, the smart mirror 200 includes a top side 204A, a right side 204B, a bottom side 204C, and a left side 204D. The enclosure 202 can be referred to as an integrated enclosure since the enclosure 202 houses all components of the smart mirror 200. As further described below, a smart mirror according to implementations of this disclosure can include additional components and/or sensors not shown in the figures.

The camera 208 is capable of two-dimensional and three-dimensional imaging. The camera 208 is necessary for the smart mirror 200 so that the smart mirror 200 can perform and/or execute augmented reality and mixed reality applications. As such, the camera 208 can be a two-element camera and/or a stereoscopic camera that includes two or more lenses. For example, the camera 208 can be a Microsoft Kinect camera or an Intel RealSense camera. For example, using images acquired by the camera 208 of a user standing in front of the smart mirror 200, the smart mirror 200 can overlay three-dimensional objects on the user in a seamless and flowing fashion as the user turns and/or moves in front of the smart mirror 200.

The smart mirror 200 is shown as including three speakers 210, namely a right speaker 210A, a left speaker 210B, and a bottom speaker 210C. However, the smart mirror 200 can include more or less speakers. For example, the smart mirror 200 can include only a left speaker and a right speaker. For example, the smart mirror 200 can include a smart bar that is disposed along the bottom side 204C or the top side 204A.

A smart mirror according to implementations of this disclosure is not limited by the number or positions of speakers. That is, the smart mirror can have any number of speakers and the speakers can be disposed at any side of the smart mirror. The speakers can be digital Hi-Fi speakers with a class D amplifier or similar types of speakers.

FIG. 2B is an example of a side view of a smart mirror 250 according to implementations of this disclosure. The smart mirror 250 can include substantially the same components as the smart mirror 200 of FIG. 2A. However, some components of the smart mirror 250 are illustrated as being disposed differently than that of the smart mirror 200 to illustrate that the components are not limited as described with respect to FIG. 2A. The smart mirror 250 includes the enclosure 202, the camera 208, and the speaker 210 of FIG. 2A, a monitor 252, a mirror 254, a touch screen 256, and a control unit 258.

The enclosure 202 is an integrated enclosure as it includes all components of the smart mirror 250. The smart mirror 200 includes other components not shown. For example, the smart mirror 250 can include one or more of outlet strips, wall transformers, power plugs, network plugs, and the like. The enclosure 202 is of sufficient depth to internally house the components of the smart mirror 250. For aesthetic reasons, it is preferable that the enclosure 202 be as thin (in the depth direction) as possible. Desirably, the enclosure is less than three inches deep.

The enclosure 202 can include recessed pockets, such as on a backside 272 for housing power plugs and/or network plugs. The monitor 252 can be mounted to the enclosure 202. As such, the enclosure 202 can include, for example, four threaded nuts, embedded in the rear of the enclosure 202, with standard bracket spacing, to accommodate standard monitor brackets. The enclosure 202 can also include ventilation holes.

The monitor 252 can be a 32 inch, a 55 inch, or other size monitor. The monitor 252 display faces the front side 206. The monitor 252 can be an LCD monitor. The monitor 252 can be portrait-mode capable so that the smart mirror 250 can be mounted in portrait mode. The brightness of the monitor 252 is such that the image displayed on the monitor 252 can be seen through partially silvered glass (as described with respect to the mirror 254). As such, the monitor 252 is capable of a minimum brightness output of 600 NITS. In order to accommodate a humid environment (e.g., a bathroom), the monitor 252 of the smart mirror 250 is preferably humidity and/or water resistant.

The monitor 252 includes a video port for connecting the monitor 252 to the control unit 258. Any suitable connection can be used. For examples, the monitor 252 and the control unit 258 can be connected via HDMI, DVI, VGA, thumderbolt, etc., depending on the monitor type. Preferably, the monitor 252 can be powered (e.g., turned on, woken from a sleep state, etc.) without a manual press of a power switch. That is, for example, the monitor 252 can be turned on via a signal from the control unit 258 (e.g., detection that a user has walked closeby).

The mirror 254 is a one-way mirror. As such, the mirror 254 includes a silvered side 260 and a reflective side 262. The reflective side 262 reflects light incident on the mirror 254 from the front side 206 of the smart mirror 250. At least some light incident on the silvered side 260 passes through. As such, information displayed on the monitor 252 can be seen from the front side 206. The mirror 254 can also be a two-way mirror.

The smart mirror 250 is capable of mirroring capabilities (via the mirror 254) and of display capabilities (via the monitor 252). In some implementations, the mirroring capabilities and the display capabilities can be implemented by one unitary mirror-display device.

Some implementations of a smart mirror include a touch screen overlay, such as the touch screen 256 of the smart mirror 250. The touch screen 256 enables a user to interact (e.g., provide input) to the smart mirror 250. In a simple example, the control unit 258 can cause the monitor 252 to display a dialog box including an OK button and a Cancel button. The user can touch the touch screen 256 at an appropriate location (e.g., in the area of the OK button) to convey selection of the OK button to the control unit 258. The touch screen 256 can be any type of touch screen. For example, the touch screen 256 can be a resistive touch screen, a capacitive touch screen, a surface acoustic wave touch screen, an infrared touchscreen, etc. A non-infrared touch screen with a minimum of 16 touch points is preferable. The touch screen 256 can be affixed to the reflective side 262 of the mirror 254. The touch screen 256 is coincident with the front side 206 of the smart mirror 250.

As shown in FIG. 2B, the camera 208, the speaker 210, and the control unit 258 are disposed behind the mirror 254. "Behind" is from the point of view of a user facing the reflective side 262 of the mirror 254. As such, except for a bezel 274, the entirety of the front side 206 of the smart mirror 250 can be occupied by the reflective side 262 of the mirror 254. However, other arrangements are possible. For example, the camera 208, the speaker 210, and the control unit 258 can be disposed in an area of the enclosure below or above the mirror 254. For example, the enclosure 202 can include a two-inch area (above or below the mirror 254) for housing the camera 208, the speaker 210, the control unit 258, and/or other components of the smart mirror 250. At least a portion of the area of the enclosure 202 is translucent so that the camera 208 can see outwardly toward the front of the smart mirror 250.

The case where the camera 208 is disposed behind the mirror 254, as shown in FIG. 2B, is now described. As described above, the backside of the mirror 254 is silvered. As such, a camera 208 disposed behind the silvered side can lose, depending on the silvering percentage of the silvered side 260, 25% or more of the brightness of the user or environment being imaged by the camera 208. The loss of brightness can lead to distortion and/or noise in images captured by the camera 208. Such distortion and/or noise can significantly degrade the operation of augmented reality algorithms and renderings performed by the control unit 258.

Accordingly, it is desirable that the view of the lenses of the camera 208 not be obscured by silvering. As such, for each lens of the camera 208, the silvered side 260 includes a masked area 270 that is not silvered. During a manufacturing process of the mirror 254, areas of the backside of the mirror 254 can be masked so that silvering is not applied to the masked areas. As such, the lenses of the camera 208 can look toward the front side 206 of the smart mirror 250 through clear glass of the mirror 254.

For privacy, implementations of a smart mirror in accordance with this disclosure can include a mechanical baffle 264 as part of the enclosure 202. A user (such that the user 104 of FIG. 1) can move the mechanical baffle 264 to cover/obscure the camera lenses and obstruct the view of the camera. The mechanical baffle 264 can be an eyelet or a cover. The mechanical baffle 264 can be a slide, can be hinged, or any other suitable baffle that is movable by a user. The mechanical baffle 264 of FIG. 2B includes a slide tab 268, which the user can use to cover and uncover the camera lenses. As such, the mechanical baffle 264 can be a sliding mechanical baffle.

When the control unit 258 is performing any operation that requires the use of the camera 208 (for example, to overlay a fashion recommendation on a user), the control unit 258 can first determine whether the lenses of the camera are "seeing" a null or back image. A null or black image can indicate that the lenses of the camera 208 are covered. As such, the control unit 258 can cause a message directing the user to uncover the lenses of the camera 208. The message can be a visual message that is displayed on the monitor 252. The message can be message audible via the speaker 210.

The speaker 210 can be used, for example, to output music played by the control unit 258 or provide other audible feedback or instructions to the user. The speaker 210 can be a Bluetooth speaker or similar type of speaker so that it can be used to output music played on a user device, such as the user device 106 of FIG. 1.

While music is being played through the speaker 210, the smart mirror 250 can be performing augmented reality operations (such as overlaying a fashion recommendation on the user). Any resonance (i.e., vibration) of the mirror, caused by the music output from the speaker can negatively affect the user experience of the augmentation. For example, assuming that the user is standing still, an outfit displayed on the monitor 252 can be static; however, the user's refection in the mirror 254 can vibrate, even if slightly. Accordingly, the outfit and the user's body may not be perfectly aligned. The vibration of the mirror can be caused by hard (i.e., direct) mounting the speaker 210 to the enclosure 202.

To prevent the degradation of the augmentation, the speaker 210 can be connected in a dampened fashion to the enclosure 202. That is, the connection can be dampened. For example, rubber washers, grommets, or other suitable elastic devices can be used to connect the speaker 210 to the enclosure 202. Accordingly, as the speaker 210 vibrates, the vibration is absorbed by the connection device and is not translated to the enclosure 202 and/or the mirror 254.

In some implementations, the smart mirror 200 or the smart mirror 250 can include additional components. For example, the smart mirror 200 can include border lighting (not shown) adjacent to at least one of the sides 204. The border lighting can be LED lighting strips or similar types of light emitting devices. The color and intensity of the border lighting can be controlled by the control unit 258. The border lighting can be connected to the control unit 258, such as via USB communication, via wireless communication, or any other suitable interface such that the control unit 258 can control the color and/or intensity of the border lighting.

In some implementations, the control unit 258 can simulate border lighting by displaying colors and intensities in areas (such as one or more borders or regions thereof) of the monitor 252.

Components (e.g., monitor, mirror, control module, camera, and other components as further described with respect to FIGS. 2A-2B) are enclosed in or by the enclosure 202. The enclosure 202 can be a fabricated of metal, plastic, or other suitable material. In the case of a metal enclosure, the enclosure 202 can include a plastic section so that the smart mirror can communicate wirelessly, such as to a server. Alternatively, the smart mirror 200 can include an antenna disposed outside the enclosure. In some implementations, the enclosure 202 can include border room for at least one of led lighting (not shown), a passive infrared (PIR) optical sensor (not shown), and stereo speaker access grill.

FIG. 2C is an example of a smart mirror 290 with a pod according to implementations of this disclosure. The smart mirror 290 includes many of same components of the smart mirror 200, 250; descriptions of the similarly numbered components is omitted. A distinguishing characteristic of the smart mirror 290 is the separating into two constituent parts: an enclosure 292 and a pod 294. The enclosure 292 includes the monitor 252, the mirror 254, and the touch screen 256. In the case that the smart mirror 290 includes border lighting, then the enclosure 292 includes the border lighting.

The pod 294 includes the camera 208, speaker 210, and control unit 258. The pod 294 can be connected to the enclosure 292 via a connection 296. The connection 296 connects the control unit 258 to the monitor 252 as described with respect to FIG. 2B (e.g., a HDMI connection or similar type of connection). The connection 296 connects the control unit 258 to the touch screen 256 as described with respect to FIG. 2B (e.g., a USB connection). In some implementations, the pod 294 can include the mechanical baffle 264 and the slide tab 268. The mechanical baffle 264 can be disposed between the lenses of the camera 208 and an internal wall 297 of the pod facing the lenses. The mechanical baffle 264 can include a slide tab 268 that extends outward and is accessible by a user. In some implementations, the pod 294 can include additional components, such as a microphone and an infrared sensor. The pod 294 can also include power components, such as for powering the mirror 254.

The pod 294 can be of a same width as the enclosure 292. As such, the pod 294 can be mounted on top or at the bottom of the enclosure 292. In some implementations, the pod 294 can include an opening 298 for receiving the enclosure 292. As such, a bottom edge of the enclosure 292 can be inserted into the enclosure 292. Alternatively, the opening 298 can be overlaid on the top edge of the enclosure 292.

A smart mirror such as the smart mirror 290 that is separated into a pod 294 and an enclosure 292 can provide several benefits. The cost of a pod 294 and its constituent components is significantly lower than the cost of components included in the enclosure 292. As such, in a case of a component failure, component obsolescence, or hardware upgrade, the pod 294 can be replaced as a unitary unit at a relatively low cost. The pod 294 can provide interchangeability. For example, a customer (an end user, a retailer, a hotelier, etc.) may already have a mirror-display. Such a customer can easily avail itself of the services and augmented reality capabilities provided by any of the smart mirrors 200, 250, 290 simply by connection a pod such as the pod 294 to the mirror-display.

Figure 3:
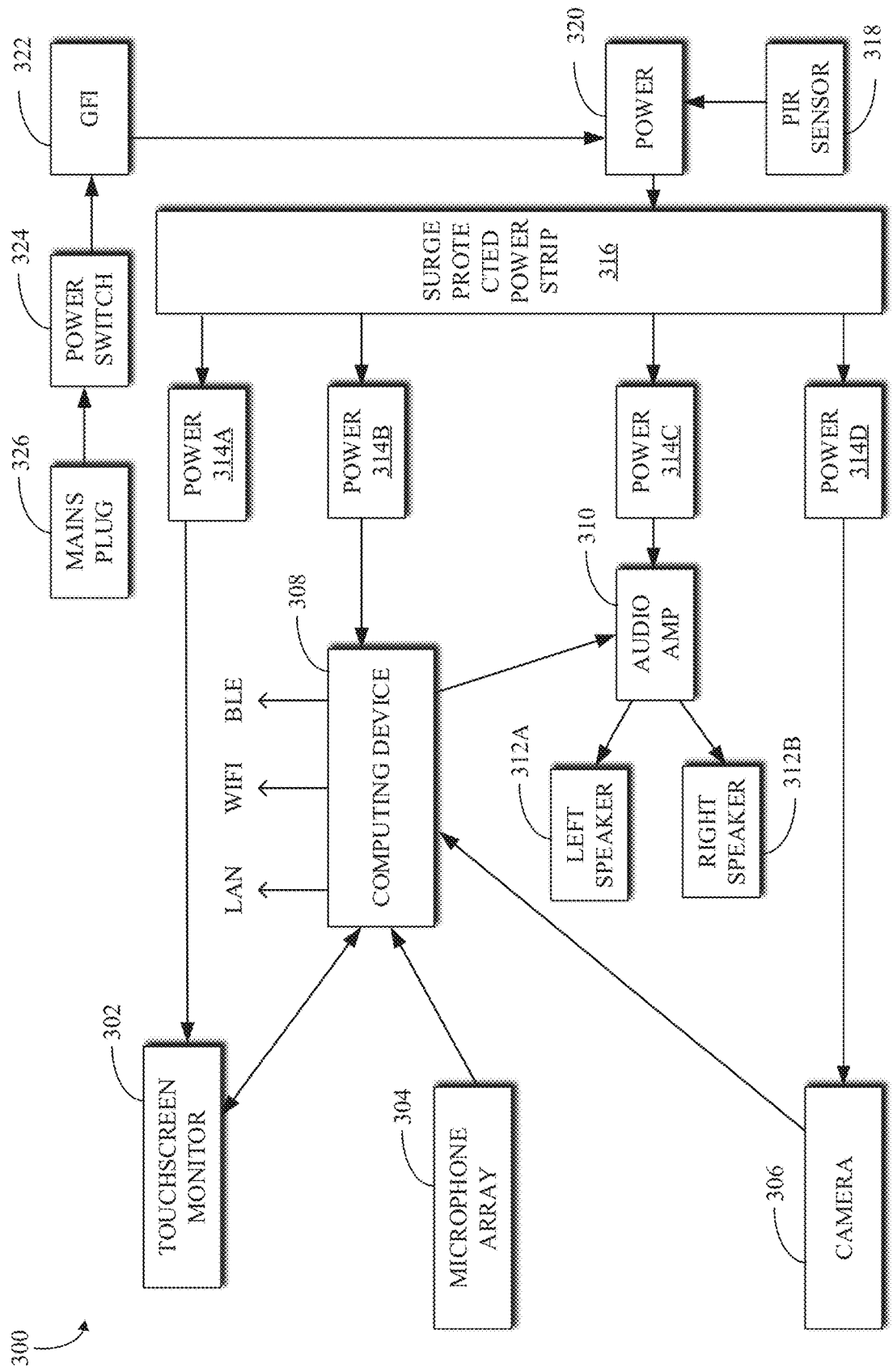
FIG. 3 is an example of a block diagram of hardware configuration of a smart mirror according to implementations of this disclosure.

As described above, the pod 294 can include the speaker 210, the camera 208, the control unit 258, and other peripherals and power components (as described with respect to FIG. 3). The front side of the pod 294, though which the camera 208 looks towards a user, can be translucent. For example, the front side of the pod 294 can be covered by a smoked, translucent acrylic. The smoked acrylic can include a clear section for exposure of the camera 208 and an infra-red sensor (if one is included in the smart mirror).

Figure 8:
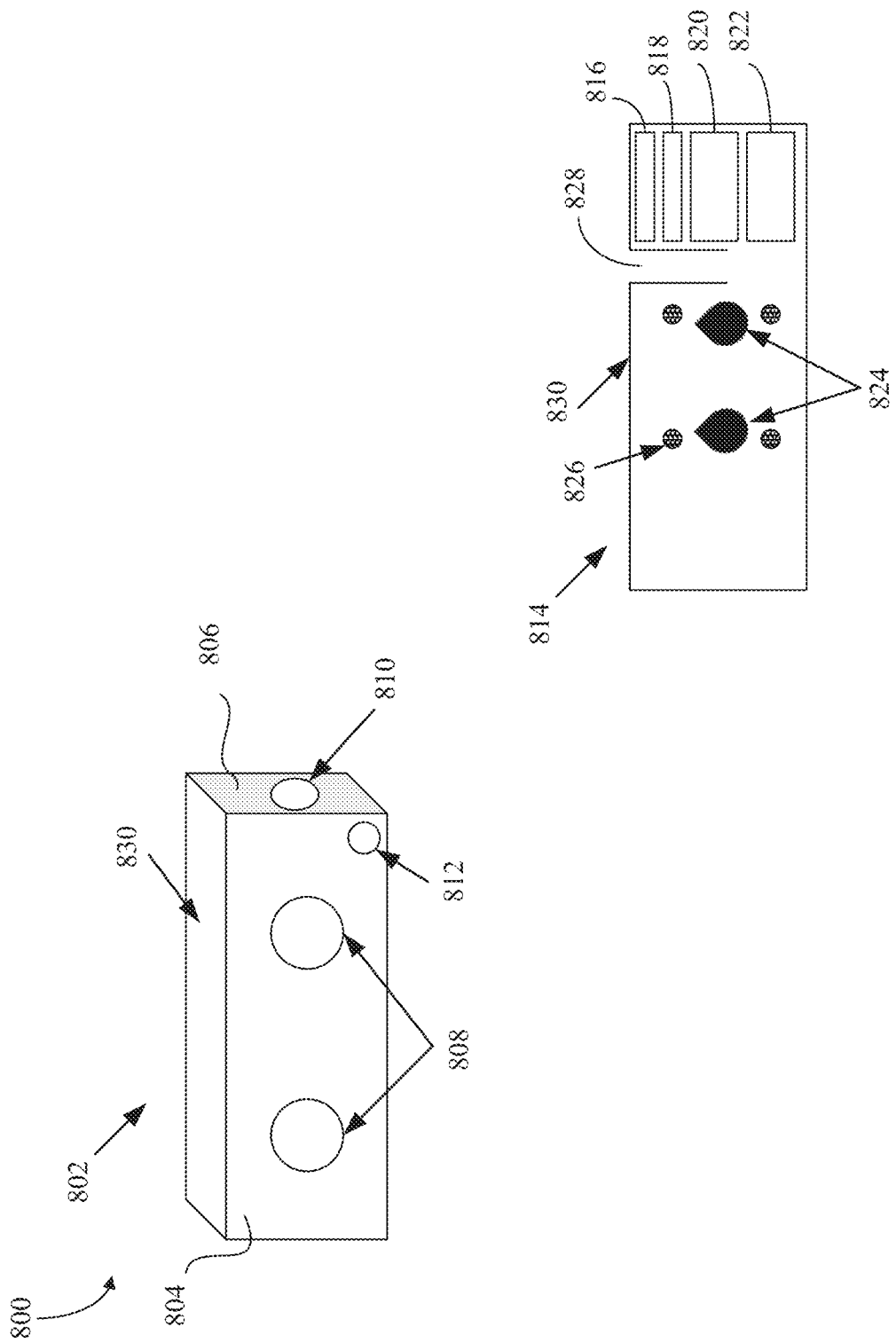
FIG. 8 is an example of a pod of a smart mirror according to an implementation of this disclosure.

FIG. 8 is an example of a pod 800 of a smart mirror according to implementations of this disclosure. As described above, the pod 800 can include a computing device, such as a computing device 308 of FIG. 3 to be described and peripherals of the smart mirror.

A perspective view 802 of the pod 800 includes a front side 804 and one lateral side, a right side 806. The front side 804 is opaque with two 100% translucent circular ports to accommodate a camera and a microphone grill. As such, the front side 804 includes camera ports 808 and a microphone port 812. Each side (i.e., a left side and a right side) of the pod 800 includes a speaker grill 810. The pod 800 can include waterproof membranes behind each speaker grill 810.

A back side 814 is also shown. The back side 814 of the pod 800 includes a section for housing desktop-computer style power mains (i.e., a power 822), a female HDMI standard connector (i.e., a HDMI port 820), one or more USB 3.0 Type A connectors (e.g., 2 USB connectors 816, 818 are shown), and a channel 828 for cable routing. The back side 814 also includes mounting holes 824 and VESA nuts 826. The mounting holes 824 can be two mounting holes, centered left to right. The VESA nuts 826 can be standard spacing threaded nuts that are flush mount and centered left to right. The channel 828 can be approximately 0.5 inches wide and 1.5 inches deep with exposed top and bottom to allow cables (e.g., HDMI, USB, and power cables) to enter the channel (from a top side 830) and connect to respective connectors. The power 822 includes a power on/off switch placed such that a person can reach the on/off switch.

As mentioned above with respect to FIG. 2C, an enclosure 292 can be mounted above a pod 294. As such, the enclosure 292 can be mounted on top of the pod 800 of FIG. 8. Alternatively, the enclosure 292 and the pod 800 can be mounted adjacent to each other. The power cables of the monitor 252 of the enclosure 292 and the pod 800 can be plugged into a duplex wall outlet.

The pod 800 can include an adjustable internal grid (not shown) to accommodate mounting of computer board and peripherals. The pod 800 can also include one or more ventilation grills at the bottom side (not shown).

FIG. 3 is an example of a block diagram of hardware configuration 300 of a smart mirror according to implementations of this disclosure. The hardware configuration 300 includes a touchscreen monitor 302, a microphone array 304, a camera 306, a computing device 308, an audio amplifier 310, speakers 312A-B, power packs 314A-D, a surge proctor 316, a passive infra-red (PIR) sensor 318, a PIR power circuit 320, a ground fault circuit interrupter (GIF) 322, a power switch 324, and a mains plug 326. A person skilled in the art can appreciate that other or different hardware configurations can be used.

As described with respect to FIGS. 2A-2B, all components of the hardware configuration 300 can be included in a single integrated enclosure. As described with respect to FIG. 2C, all but the touchscreen monitor 302 can be included in a pod and the constituent parts of the touchscreen monitor 302 can be in a separate enclosure. The microphone array 304, the camera 306, the PIR sensor 318, and microphone array 304 can be referred to collectively as the peripherals. As such, the pod includes the peripherals and the computing device 308.

The power switch 324 is a user-accessible, main power switch. The power switch 324 can be disposed on a user-accessible (i.e., external) side of the enclosure or pod.

In an implementation, the touchscreen monitor 302 can be the combination of the monitor 252 and the mirror 254 of FIG. 2B or FIG. 2C. In another implementation, the touchscreen monitor 302 can be the combination of the monitor 252, the mirror 254, and the touch screen 256 of FIG. 2B.

The microphone array 304 can be connected to the computing device 308 via a USB connection or any other suitable connection. The microphone array 304 can be used to receive verbal commands from a user, such as the user 104 of FIG. 1. The camera 306 is as described with respect to the camera 208 of FIG. 2. The camera 306 is capable of stereoscopic imaging. In an example, the camera 208 is a high resolution (4K) camera.

The computing device 308 can be, or can be part of the control unit 258 of FIGS. 2A-2C. The computing device 308 is capable of performing input/output as required for the operation of a smart mirror. The computing device 308 can include one or more USB ports. For example, one of the USB ports can be sued to connect the computing device 308 to a touchscreen of the touchscreen monitor 302. The computing device 308 can be, for example, an Intel Next Unit of Computing (NUC) device. The computing device 308 can be the control unit 258 of the smart mirrors 200, 250, and 290 of FIGS. 2A-2C.

The computing device 308 can be, or can include, a central processing unit (CPU). The computing device 308 can include a graphical processing unit (GPU). Alternatively, the computing device 308 can be any other type of device, or multiple devices, capable of manipulating or processing information and graphics now-existing or hereafter developed. Although the disclosed implementations can be practiced with a single computer as shown, e.g., the computing device 308, advantages in speed and efficiency may be achieved using more than one processor or computing device in combination.

The computing device 308 includes a memory. The memory can be a read-only memory (ROM) device or a random access memory (RAM) device in an implementation. Any other suitable type of storage device can be used as the memory. The computing device 308 can also include a secondary storage. The secondary storage can be a solid-state drive (SSD), a spinning hard drive, or any other suitable secondary storage.

In one non-limitation configuration, the computing device 308 can include an Intel 2.8 GHz dual core CPU, an nVIDIA 1060 GPU, 16 GB of RAM, and a 200 GB SSD hard drive.

The memory can include executable instructions and data that are accessed by the CPU. The memory can further include an operating system and application programs, the application programs including at least one program that permits the CPU to perform the methods described here, such as augmented reality and mixed reality methods. The computing device 308 can include, in the memory and executable by the CPU, an augmented and virtual reality software module and other libraries. The software module can be, for example, the Unity video game engine, developed by Unity Technologies. The software module can be the Unreal Engine, developed by Epic Games. The other libraries can include the OpenCV library which enables real-time computer vision and the OpenNI (i.e., the Open Natural Interaction open source library).

In an example, the software module (e.g., the video game engine) can be invoked by an application included in the memory in order to provide a Virtual Mirror (i.e., augmented reality) function. In an implementation, the Virtual Mirror function can be composed of several "Actors" arranged in a Virtual Scene. An Actor, in this context, can be any rendered object placed in a 3D environment such that the Actor can be sized, moved, and/or rotated independently of any other Actor. As an example, the user's skeletal model with a superimposed captured image can be one Actor. Each of the clothing 3D models wrapped around (i.e., overlaid on) the user's model can constitute additional Actors. The background can be a single "Plane" Actor. The background Actor can be used to play a video (e.g., a cinematography), or can be composed of multiple 3D model Actors comprising a fully rendered 3D scene.

In an example, the openNI and openCV libraries can be used to identify the user's face and features. In an example, the identified face and/or features can be used to map the user's traits. For example, the traits can include skin dryness. The traits can be used to identify symptoms (as further described below) and provide treatment and/or remedial suggestions. For example, the traits can be used to apply (i.e., overlay) makeup, overlay other images onto the user, recommend products, and/or provide other information to the user.

In some implementations, the memory can include, and the CPU can execute, support software that enables a remote support engineer and/or technician to remotely connect to the smart mirror to diagnose problems and perform maintenance. For example, via the support software, a support personnel can perform software upgrades (such as an upgrade of the operating system and/or an upgrade of application software) and/or remotely test components of the smart mirror. In an example, the support software can be the TeamViewer software.

The operating system can be any suitable operating system, such as a Windows operating system, an Android operating system, a Linux operating system, an iOS, etc. In an implementation, a Windows version 10 Pro can be used.

The computing device 308 is in communication with one or more sensing devices. For example, the computing device 308 can be in communication with the camera 306 and the PIR sensor 318. The computing device 308 can be in communication with sound-sensing devices, such as the microphone array 304.

Network connectivity is essential to the smart mirrors according to implementations of this disclosure. As such, the computing device 308 is capable of at least one of wired network communication or wireless network communication. In the case of wireless network communication, it is preferable that a proprietary (i.e., dedicated) channel (i.e., as opposed to a Guest or other highly shared channel) be set up on a router for exclusive use by the smart mirror. A proprietary channel can ensure that the smart mirror has available a minimum predefined amount of Internet access bandwidth. The proprietary channel can be set up with encryption, such as Wired Equivalent Privacy (WEP) or a similar encryption mode.

The computing device 308 can also include a device capable of Bluetooth and/or Bluetooth Low Energy communication. For example, using Bluetooth, the computing device 308 can cause music streamed from a Bluetooth paired device (e.g., the user device 106 of FIG. 1) to be output via an audio amplifier 310.

The computing device 308 can be capable of being powered without requiring, such as by a user, a press of a physical power switch. For example, in response to the PIR sensor 318 sensing the presence of a user, the computing device 308 can be powered.

The audio amplifier 310 and the speakers 312A-B can be used to provide audible feedback to the user, play music, and the like. The hardware configuration 300 is shown as including two speakers, a left speaker 312A and a right speaker 312B. However, a smart mirror according to this disclosure can include more or less speakers.

The hardware configuration 300 can include one or more power packs 314 for supplying power necessary for powering components of a smart mirror. For example, a power pack 314A can be used to supply power to the touchscreen monitor 302, a power pack 314B can be used to supply power to the computing device 308, a power pack 314C can be used to supply power to the audio amplifier 310, and a power pack 314D can be used to supply power to the camera 306. Each of the power packs 314 is driven from the mains plug 326. The mains electricity can depend on the country and/or region that the smart mirror is used. In the United States, the mains electricity can be assumed to be 120 VAC, 60 Hz, and 15 Amps.

The PIR sensor 318 can be used to monitor and detect for a user's body heat. When the body heat is detected, the smart mirror can be turned on. The PIR sensor 318 can be an integrated or a standalone PIR sensor. In the case that the PIR sensor 318 is a standalone sensor, then the hardware configuration 300 includes a PIR power circuit 320. The PIR power circuit 320 can provide, for example an on/off control voltage to the outlet strip of the smart mirror. In the case that the PIR sensor 318 is an integrated PIR sensor, the PIR sensor 318 can be mated with a high power relay to provide on/off voltage control to the power strip of the mirror.

In an implementation, the smart mirror is always in the on state and displays a black screen while a user is not detected. When a user is detected, the computing device 308 can replace the black screen with another user interface. Some implementations of the smart mirror do not include a PIR sensor 318. Rather, the camera 306 can be used for detecting a user in front of the camera.

Accordingly, in the case where the camera 306 is used to sense the presence of a user, the camera 306 and the computing device 308 remain running (i.e., not set to enter sleep or hibernate states). However, the computing device 308 can control the touchscreen monitor 302 (e.g., the monitor) to enter a low power mode when a user is not detected. In the case where a PIR sensor 318 is used to sense the presence of the user, the computing device 308, the camera 306, and the touchscreen monitor 302 can be turned off (or set to a standby state). Upon the sensing of a user, the computing device 308, the camera 306, and the touchscreen monitor 302 can be turned on (or awoken from the standby state).

Some implementations can include a surge proctor 316 to protect the smart mirror from power glitches. The smart mirror can also include an outlet strip that includes automatically resettable and surge survivable surge protection and a ground 322 (Ground Fault Interrupter) electrocution protection circuit.

Some implementations of a smart mirror can be self-sustaining. As such, instead of, or in addition to, receiving power as described above, the smart mirror can receive power from a solar panel or wireless charging.

Figure 4:
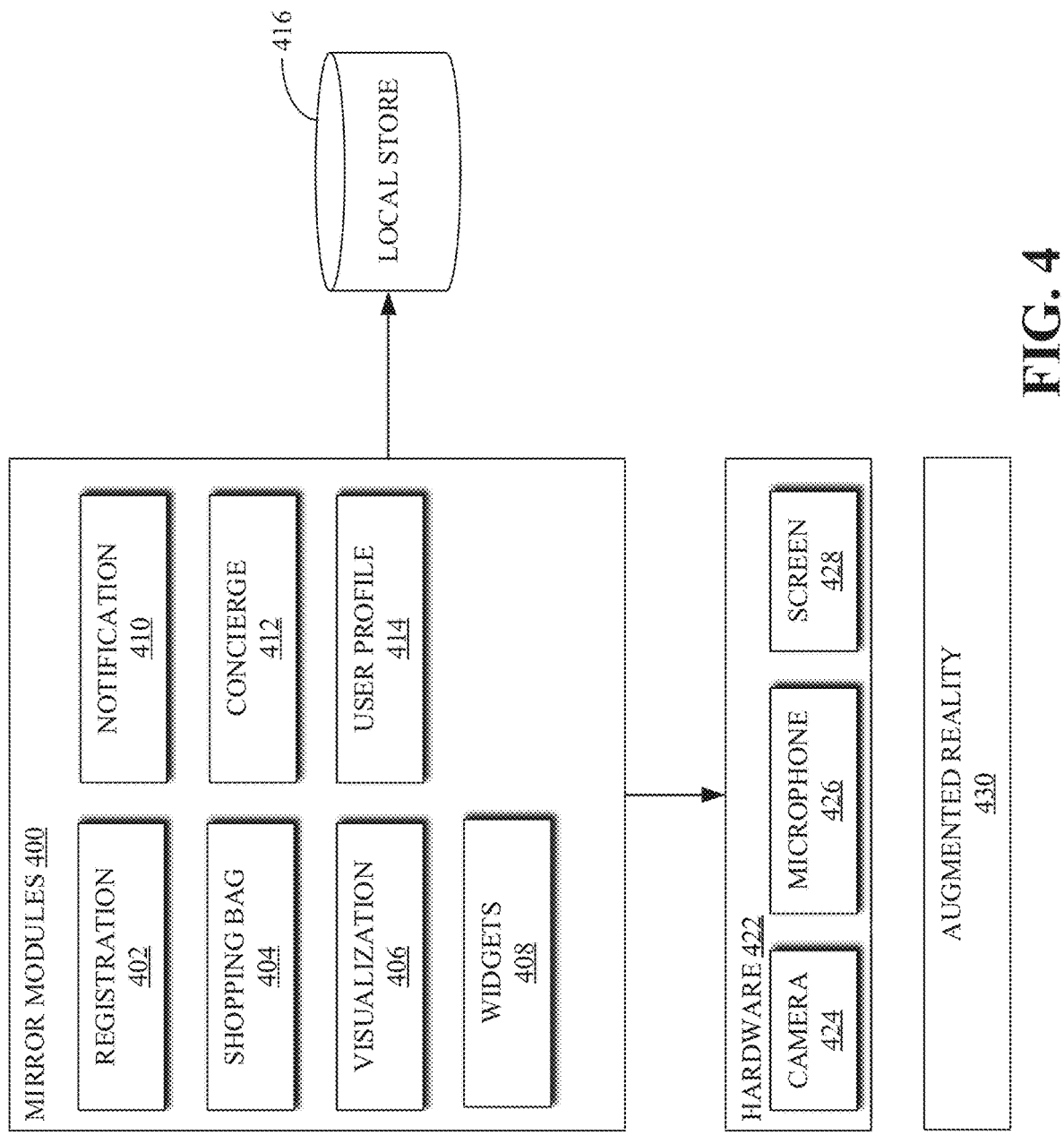
FIG. 4 is a diagram of modules of a smart mirror of a smart mirror system according to implementations of this disclosure.

FIG. 4 is a diagram of modules 400 of a smart mirror of a smart mirror system according to implementations of this disclosure. The modules 400 are modules of a smart mirror, such as the smart mirror 102 of FIG. 1. At least some of the modules 400 can also be modules of a companion application that is executable by a user device, such as the user device 106 of FIG. 1. The modules can be stored in the memory of, and executed by the CPU of, the computing device 308. In some implementations, a smart mirror can include more, less, or other modules. Some of the modules may be combined. FIG. 4 also depicts hardware components of a smart mirror, namely a camera 424, a microphone 426, and a screen 428, as described with respect to FIGS. 2-3, and an AR module 430.

The modules 400 includes a registration module 402, a shopping bag module 404, a visualization module 406, a widgets module 408, a notification module 410, a concierge module 412, and a user profile module 414. Some implementations of the modules 400 can include more, less, or other modules. In some implementations, various modules of the modules 400 may be combined. In some implementations, modules shown as being part of the modules 400 may simply receive commands from a user and forward the command to the module available at a server, such as the server 108 and receive feedback (e.g., a message, a result, etc.) to be displayed to the user on the mirror display.

The registration module 402 can be used to associate a user with the smart mirror. For example, the registration module 402 can receive a code from the user to associate the user with the mirror. In another example, the registration module 402 can use the camera 424 to recognize the user (e.g., facial recognition) and associate the user with the smart mirror.

The shopping bag module 404 can maintain and display a list of items that the user adds to the list. The user can add, remove, change quantity, change color, etc. of items in the list. The visualization module 406 can be used to display graphical information on the screen 428 of the smart mirror. For example, the visualization module 406 can be used to display cinematography, weather information (e.g., weather patterns, forecast, etc.), still images, and or video sequences on the screen 428 as further described below.

The visualization module 406 can also use the AR module 430 to display mixed reality displays as further described below. For example, to display a 3D clothing model on an image of a user moving in real-time, the 3D model can to be rigged onto an underlying skeletal mesh of the user. The skeletal mesh can be a generic skeletal model. The height and width parameters of the generic skeletal model can be adjusted based on the user's actual appearance as detected with the stereoscopic camera. In an implementation, at least two generic skeletal mesh models can be maintained: a male skeletal model and a female skeletal model. In an implementation, additional generic skeletal models can be used. For example, a skeletal model can be maintained for each body type or for children versus adults. Once a particular skeletal mesh is selected, and its parameters are adjusted, input from the stereoscopic camera can be used to move individual joints, and with them, the 3D models of clothing attached to them.

The widgets module 408 can include a list of visual components (e.g., buttons, vertical lists, calendar widgets, neighborhood widgets) that can be used for constructing and displaying user interfaces. The list of visual components provides for a consistent user experience and an encapsulation of functionality.

The notification module 410 can be used to alert the user. For example, the notification module 410 can be used to display a visual notification on the display of the mirror to remind the user of an upcoming event. The notification module 410 can be used to audibly alert the user via sound, vibration, flashing lights, etc.

The user profile module 414 can update the user's profile based on the user's selections, buying preferences, and any other navigation. For example, the user profile module 414 can keep track of which outfits the user tried but did not purchase, which outfits the user tried and purchased, which outfits the user purchased without trying, which restaurants the user viewed but did not book, which restaurants the user booked, and so on, to improve the recommendations of the smart mirror system. Via the user profile module 414, the user can provide his or her preferences with respect to certain services, as described above.

A local data store 416 can be used to cache (i.e., store) skeletal models and/or other video files for rapid access.

The concierge module 412 can connect the user to a concierge service that can assist the user in completing a reservation (such as at a restaurant). In an example, the concierge module 412 can use a concierge module of a server.

Figure 5:
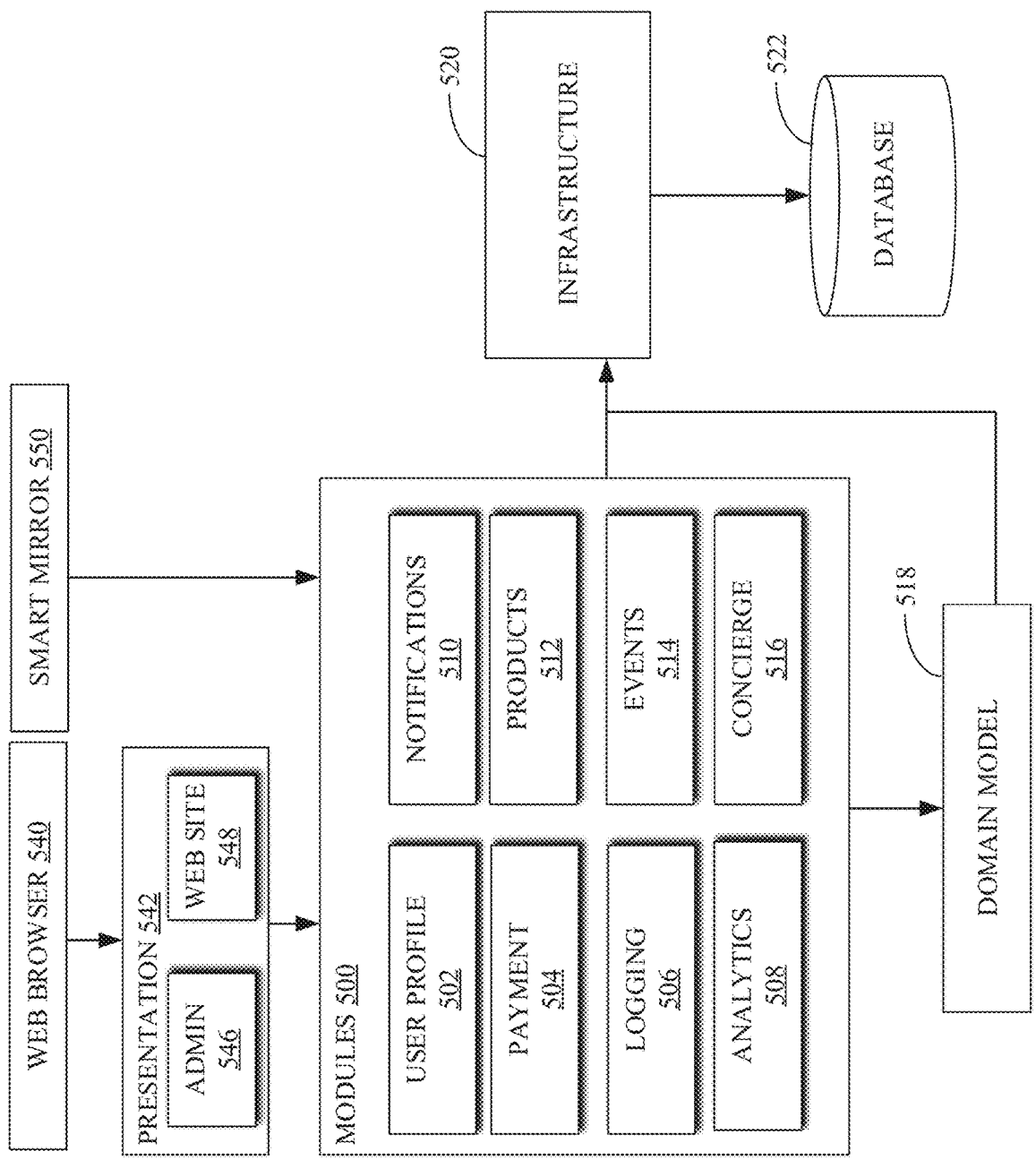
FIG. 5 is a diagram of modules of a server of a smart mirror system according to implementations of this disclosure.

FIG. 5 is a diagram of modules 500 of a server of a smart mirror system according to implementations of this disclosure. The smart mirror system includes a smart mirror 550. The modules 500 can be implemented by a server such as the server 108 of FIG. 1. The modules 500 include a user profile module 502, a payment module 504, a logging module 506, an analytics module 508, a notifications module 510, a products module 512, an events module 514, and a concierge module 516.

A web browser 540 can be used to access the server, thereby accessing and/or causing the server to execute, at least some of the modules 500. A presentation layer 542 can be provide user interfaces for accessing one or more of the modules 500 via the web browser 540. The presentation layer 542 is responsible for all interactions with end users. The presentation layer 542 contains components that implement and display user interfaces and manage user interactions. The presentation layer 542 includes controls for user input and display, in addition to components that organize user interaction.

The presentation layer 542 can include two modules: an administration portal 546 and a web site portal 548. Administrative users can use the administration portal 546 of the presentation layer 542; end-users can use the web site portal 548 of the presentation layer 542. A "site" or "portal" is a set of user interfaces.

For example, via the administration portal 546, an administrator can add additional products (e.g., apparel items, outfits, etc.) into the products module 512. For example, via the administration portal 546, an administrator can manage user accounts and permissions, view error and site activity logs, as well as monitor components and modules.

The web browser 540 can be executed from a user device, such as the user device 106 of FIG. 1. The user device can be a hand held device (e.g., smartphone) executing a smart mirror companion application, as further described below. For example, the end-user can use the web site portal 548 to update his or her profile. A new user can also create a profile using the web site portal 548.

A user of the smart mirror 550 can cause the functionality of one or more of the modules 500 to be performed.

The products module 512 can be used to manage a catalog of products presented to users via the smart mirror 550. The products module 512 can maintain inventories of products that can be offered to and/or purchased by users. The products module 512 can also handle financials related to products available via the smart mirror system.

The events module 514 can be used to manage events tracked by the server and events presented to users. The events module 514 can be used to book and/or organize events. For example, the events module 514 can recommend events and/or venues, for example as described with respect to FIG. 6D. For example, the events module 514 can transmit a request to book an event at a specific venue. The event module 514 can be integrated with one or more third party services such as OpenTable, Yelp, Ticketmaster, or the like for electronically scheduling events. The events module 514 can use one or more of components of the infrastructure layer 520 to communicate with a third party service.

The payment module 504 can be used to process (e.g., accept, remit, etc.) user payments for products purchased.

The concierge module 516 can be used for fielding (e.g., accepting, receiving, etc.) user requests and notifying staff to act on the fielded requests. The staff can be the staff of a server, such as the server 108 of FIG. 1. For example, a user can request (as described with respect to FIG. 6D below) a reservation at a recommended restaurant, The Standard Grill. The staff receives a notification of the request and calls the restaurant to initiate the reservation on behalf of the user. The analytics module 508 can be used to capture metrics. The metrics can include user activity and/or smart mirror activity.

The modules 500 can implement a domain model 518. The domain model 518 is the core of the system and contains components that provide rules, workflow, and entities representing different areas of concern. The modules 500 can implement (e.g., support, execute, etc.) one or more user processes. A user process may require data for its execution. After a user process collects the data it requires, the data can be operated on using business rules. Some of the business rules describe how the data are to be manipulated and transformed as dictated by the user process. The rules may be simple or complex, depending on the user process itself. Examples of entities include User, Product, Order, Bag, Payment, Event, and Concierge.

An infrastructure layer 520 provides components that can used by the modules 500 and the domain model 518. The components of the infrastructure layer 520 can serve as adaptors for various technologies used for supporting and/or implementing the user processes. These adaptors can be used for communication with internal and external resources, including third parties. The components of the infrastructure layer 520 can include a data access component, an email component, a caching component, a security component, a messaging component, an exception management component, and a logging and auditing component.

A database 522 can be used as a permanent store of information of the smart mirror system. The database 522 can be any type of data store including, but not limited to, a relational database, an object database, one or more files, a store of unstructured data, and the like.

FIGS. 6A-6D are screenshots of examples of a flow of an application 600 that uses a smart mirror according to implementations of this disclosure. The application 600 is described with respect to a smart mirror (such as the smart mirror 102 of FIG. 1, the smart mirror 200 of FIG. 2A, the smart mirror 250 of FIG. 2B, or the smart mirror 290 of FIG. 2C) installed at a hotel room or other type of business. However, that need not be case. It can be appreciated that aspects described with respect to the application 600 can be used regardless of where the smart mirror is installed. The user interfaces illustrated in the application 600 are illustrative examples of what a user, interacting with the smart mirror, sees through the mirror (i.e., a reflection and/or what is displayed by the monitor).

As further described below, what the user sees in the mirror can be items (e.g., widgets, information, images, videos, etc.) displayed by a control unit (e.g., the control unit 258 of FIG. 2) on the display (e.g., the monitor 252 of FIG. 2) of the smart mirror, the user's own reflection in the mirror (e.g., the mirror 254 of FIG. 2), and/or a three-dimensional augmented reality display. In an example, the three-dimensional augmented reality display includes three-dimensional representations of outfits displayed by the control unit overlaid on top of the user. The control unit of the smart mirror uses a camera of the smart mirror to track the movement and orientation of the user so that the orientation and placement of the overlaid outfit remain synchronized with the user's body. That is, the overlaid outfit continues to look to the user looking into the mirror as if the user is wearing the outfit.

The smart mirror of the application 600 is communicatively connected to a server (such as the server 108 of FIG. 1). The server can associate one or more users with the smart mirror. For example, if the smart mirror is installed at a hotel room, then the user can associate the mirror with one or more of the occupants of the hotel room. The user can also have a profile at the server. As the user profile can be stored at the server, the user profile can be available wherever the user is. As such, the user profile can be said to travel with the user and can be used when the user profile is relevant to a user interaction and/or experience. For example, the hotel can use the user profile to adjust and setup a room for the user. For example, a retailer can use the user profile to supply the right items of clothing to the user. The user profile can be populated with information from one or more sources including the user, analytical data based on the user's use of one or more smart mirror systems, a mobile companion application, and/or the applications that use a smart mirror system.

Figure 6A:
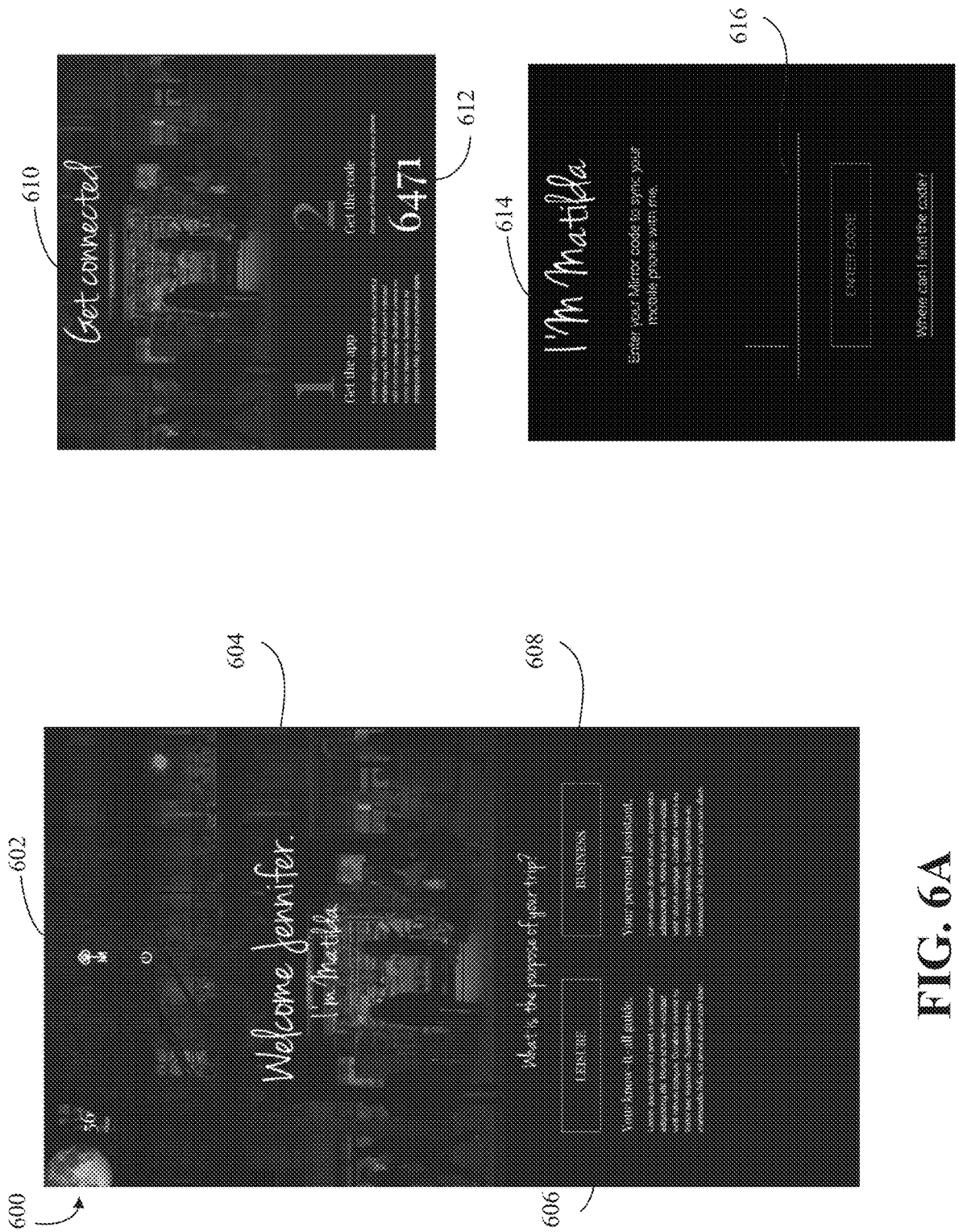

FIG. 6A illustrates a welcome screen 602. The welcome screen 602 is displayed when the smart mirror detects the presence of the user. For example, as described above, a PIR sensor (e.g, the PIR sensor 318 of FIG. 3) can detect the presence of the user. If the smart mirror is not equipped with a PIR sensor, the user's presence can be detected by the camera of the smart mirror or by other means (e.g., GPS location relayed from the user's smartphone).

The welcome screen 602 can display the user name 604 (e.g., "Jennifer"). In an example, upon checking into the hotel room, the smart mirror can be associated with the user by hotel personnel and/or hotel systems. "Associated with the user" is meant that the server associates a profile of the user, maintained at the server, by a representation of the mirror also maintained at the server. If a profile of the user does not already exist, one can be created by the server automatically.

In another example, a device of the user (e.g., the user device 106 of FIG. 1) can include a companion application for use with a smart mirror. The companion application can be used to associate the user with the smart mirror. For example, Near-Field Communication (NFC) chips in the user device, in conjunction with the companion application and a second NFC chip in the smart mirror, can be used to associate the user with the smart mirror when the user places the user device in the proximity of the smart mirror.

In another example, and in a case that the user already has a profile that includes one or more photos of the user, the control unit can control the camera of the smart mirror to capture one or more images of the user that the control unit forwards to the server. Facial recognition can be performed by the server to identify the user and associate the user with the image. In yet another example, the smart mirror can include one of more biometric devices (e.g., a fingerprint reader, retinal scanner, etc.) which can be used to identify the user.

In yet another example, the user may receive a code to be entered into the smart mirror. By entering the code into the smart mirror and the user's device, the user can be associated with the mirror.

In yet another example, the user can be identified via two-stage authentication whereby the user enters, into an interface of the smart mirror, a User ID and Password. A single identifier can also be used, however, with much reduced security. In yet another example, the smart mirror can include a QR reader and the user can be identified by positioning a previously received QR code in view of the QR reader. In an example, the received QR code can be received by an operator the server when the user registers with the server.

In yet another example, through the stereoscopic camera, the user can be identified through a combination of facial recognition routines and body comparisons. The user can first be prompted to enter his or her credentials. The control module of the smart image can cause the stereoscopic camera to capture full body images of the user. The smart mirror system can then associate (i.e., by storing in a server, such as the server 108 of FIG. 1) the body image of the user with the user.

On subsequent access attempts by the user to the smart mirror system, the system can again take a full body image of the user. By performing a search for a matching body image, the user is identified and the user need not enter his or her credentials. In case a match is not found, the user is prompted to reenter his or her credentials. Using previously stored full body images associated with the user, the system can enhance its ability to recognize the user based on the previously captured and the newly captured full body images of the user. As such, the smart mirror system can learn from its mistakes and enhance its ability to automatically recognize the user. Alternatively, and as illustrated by get-connected screen 610, upon detecting the user's presence, the smart mirror can provide the user with a code 612 (e.g., 6471) to be entered into the companion application. The user can enter the code 612 in a get-connected screen 614 of the companion application. The user is associated with the smart mirror when the user enters the code in the code entry field 616 of the companion application.

Via the welcome screen 602, the user can select a leisure button 606 or a business button 608 button to indicate that the purpose of his or her current stay at the hotel is for leisure or business, respectively. The placement of widgets (e.g., the leisure button 606 and the business button 608) on the display of the smart mirror is not fixed. That is that the placement of widgets for one user may be different from the placement for a second user. The control unit can use the camera to determine the height of the user so that widgets (e.g., buttons and content) are displayed, for ease of use, at or above the waist of the user.

The application 600 presents different application flows depending on whether the user selects leisure or business. The leisure application flow is tailored to events and adding things (e.g., places, cites to see, restaurants, etc.) to the user's agenda. The business application flow is tailored to the user's current schedule, to getting the user from one location on the user's agenda to the next, and to ensuring that the user has available all the products, tools, and information.

Figure 6B:
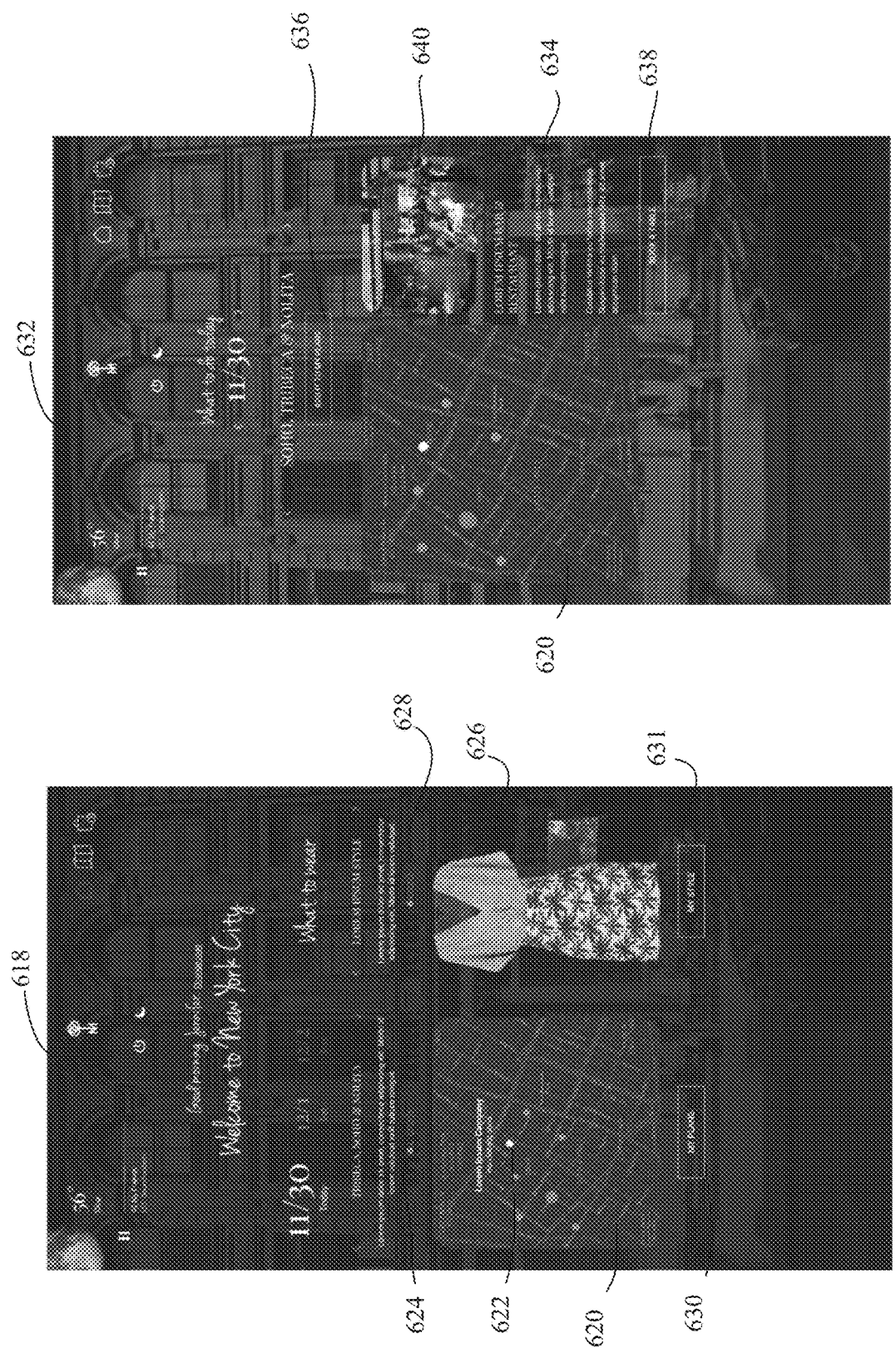
Figure 6C:
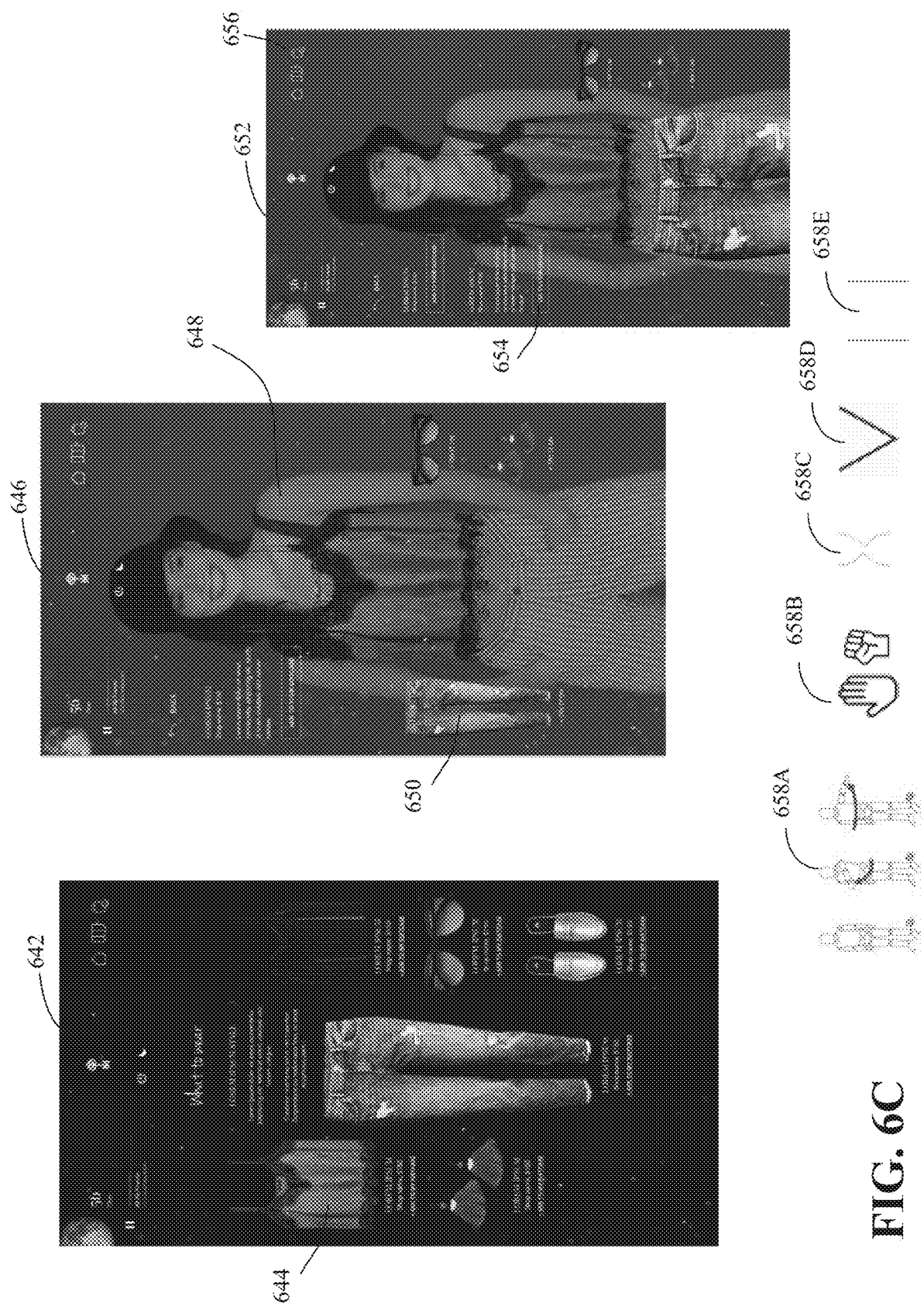

FIG. 6B illustrates a user flow when the user selects the leisure button 606. The user is presented with a leisure screen 618. In the leisure screen 618, recommendations (such as fashion recommendations) are correlated, by the server, to neighborhoods. The server groups the user's calendar events into neighborhoods or locations. The user's plans (e.g., events, meetings, etc.) are maintained by a smart mirror system, such as the smart mirror system 100 of FIG. 1. More specifically, the user's plans can be maintained by the server 108 of FIG. 1. The user profile can include linked calendars. That is, the user's plans, maintained by the server, can be supplemented with additional events extracted from, synched with, copied from, etc., the linked calendars. For example, the user can link one or more of a Google, an Outlook, an iCloud, a Facebook, a Yahoo, etc. accounts to his or her server profile via single sign or other suitable mechanism. As such, the server and thereby the smart mirror can access the user's events and calendars.

Neighborhoods are defined based on the vibe, style, character, or other distinguishing characteristics of the locations of the events on the user's calendar(s). The leisure screen 618 shows a neighborhood 620 that includes seven events (marked by dots on the map) at seven locations, such as the location 622. The user can use the neighborhood groups 624 widget to display other neighborhoods. A neighborhood can include events retrieved from the user's events and/or calendars as well as events that are added (i.e., recommended) by the server. Events added by the server can be visually distinguished from other events. For example, an event at the location 622 is an added event.

For a currently selected neighborhood, the user can navigate through the fashion recommendations selected by the user using the outfit scroll 628. An outfit 626 is shown as appropriate dress for the selected location 622 of the neighborhood 620. If the user chooses the button labeled "MY PLANS" (i.e., button 630), the smart mirror displays a my-plans screen 632.

The my-plans screen 632 includes a description 634 of the selected event at a location in the neighborhood 620. The my-plans screen 632 also includes a graphical area 640 that displays a visual of the selected event. The visual can be a still image, a video, a live video feed from the location (if available), a cinematography of available images or videos of the location.

If the selected event is a recommended event, the user can select an add-to-plan button 636 to add the event to his or her calendar. The user can also select a booking button 638. The label of the booking button 638 can vary depending on the event type and/or category. For example, if the location is a restaurant, then the booking button 638 can be labeled "Book a Table." Depending on the event and/or the venue, the booking button 638 may automatically make a reservation via an automated system; or initiate a call, using the user's device to the venue, to the hotel concierge or to an operator of the server. The operator of the server is the service provider that provides services associated with smart mirrors.

The user's plans and/or one or more neighborhoods can be animated via cinematography. For example, the server can create a cinematography of the at least some locations of the neighborhood 620. In an example, the cinematography can be displayed in a graphical area 640 of the my-plans screen 632. In another example, the cinematography can be displayed as the background of the my-plans screen 632.

The cinematography can include all locations in the neighborhood, user-selected locations of the neighborhood, or only those locations that are currently in the user's plans. The cinematography can include street views along the route displayed in the neighborhood 620 and images of the locations of the neighborhood 620. In an example, Google Street View Hyperlapse, created by Teehan+Lax Labs, or any similar services can be used to create the cinematography. The cinematography is created on demand (i.e., when it is to be displayed). In some examples, cinematography may be pre-created for pre-determined neighborhoods or sets of recommendations.

Referring again to the leisure screen 618, when the user selects a my-styles button 631, a my-styles screen 642 (shown on FIG. 6C) is displayed by the smart mirror. The my-styles screen 642 shows parts of a recommended outfit for the location selected on the leisure screen 618. The my-styles screen 642 is an editorial page design layout that includes a respective description of each fashion item displayed. By selecting one or more items displayed on the my-styles screen 642, a mixed/augmented reality display of the user with the items overlaid on the user is shown.

For example, if the user selects an item 644 on the my-styles screen 642, a mixed reality display 646 is displayed. The user selection of the item 644 is transferred by a control (e.g., the control unit 258 of FIG. 2B) to the server along with images of the user as taken by a camera (e.g., the camera 208 of FIG. 2A). The server uses the images to determine the user measurements and returns to the control unit 258 a three-dimensional model of the selected item. Alternatively, the control unit 258 can determine the user measurements. The control unit 258, using an AR module (e.g., the AR module 430 of FIG. 4) can overlay (fit, rig, etc.) the three-dimensional model of the selected item on the user. That is, the control unit 258 can determine the position of the user's body and the user's location with respect to the mirror and the camera and displays the three-dimensional model of the selected item using an appropriate orientation and location on a monitor (e.g., the monitor 252 of FIG. 2B). Accordingly, the user (i.e., the user 648), looking at the mirror looks as if the user is wearing the item.

Similarly, if on the mixed reality display 646, the user 648 selects another item (e.g., item 650), a three-dimensional model of the item 650 is also overlaid on the user 648 in a mixed reality display 652.

The user can select an add-to-purchases button 654 to add an item of fashion to a shopping bag. When the user selects to add an item to the shopping bag, the control unit 258 forwards a request to add an item to the shopping bag, along with an identifier of the selected item, to the server. The user's shopping bag can be a data structure that is maintained at the server. The user can select a view-bag button 656 to show all items currently in the shopping bag. When the user selects the view-bag button 656, the server forwards, to the control unit 258, information that the control unit 258 uses to display a bag screen 670 as shown in FIG. 6D. Using the bag screen 670, the user can modify the contents of the bag and proceed to checkout to purchase the items in the bag.

Returning to FIG. 6A, if the user selects the business button 608, the smart mirror system displays a business screen 672, as illustrated in FIG. 6D. The business screen 672 displays the user's events for the day. In the illustrated example, the user selects a time slot 674 (e.g., the 12:30 PM timeslot), which is recognized by the smart mirror system to be a lunchtime timeslot. As such, the smart mirror system can make a recommendation 676 to the user. The recommendation can include combinations of venues and appropriate outfits for each of the venues.

If the time slot 674 does not already include a venue (e.g., a restaurant), the smart mirror system can recommend a venue 678 that may be proximal to other events on the user's calendar. Recommending a venue can include recommending multiple venues from which the user can select. Proximal, as used herein, can mean geographically proximal and/or similar in character and style to at least one other event on the user's calendar and/or the neighborhood of other events on the user's calendar.

The smart mirror system can use the venue (whether recommended or already on the user's calendar) to recommend one or more appropriate outfits for the venue. In the illustrated example, the smart mirror system recommends the venue 678 "The Standard Grill." The smart mirror also recommends an outfit 680 that is appropriate for the venue 678. The user can interact with the business screen 672 in similar ways as described with respect to the leisure screen 618.

In an implementation, the background of a mixed reality display can display images and/or video of to the recommended location (e.g., restaurant, event, social gathering) or can display a neighborhood scene. In an implementation, the background of the mixed reality display can, instead or additionally, display a weather effect (e.g., rain, show, sun, etc.), such as the expected weather at the time of the event. Accordingly, the user 648 can see herself in the mirror with the virtual/augmented reality background.

In a user scenario, the user may select random outfits to try. That is the user can try outfits based on a search (e.g., "search for outfits appropriate for zip code 10012," "search for bathing suits," etc.). As the user tries on outfits, the background of the mixed reality display can display a teaser environment that can cause the user to take action. As mentioned above, the user can search for "bathing suit." As the user tries on the bathing suits (in the mixed reality environment), the background can display images of Miami, beaches, islands, spa, etc. The display can also include actions that can be invoked by the user, such as "Book a Linda's Spa," "Buy Ticket to Miami," etc.

In some cases, outfits for purchase and/or rent may be available at a hotel room closet. Each outfit can include a Radio-frequency identification (RFID) tag. The smart mirror can include an RFID reader. As the user tries-on an outfit, the outfit is identified based on the RFID and appropriate background images and actions can be displayed in the mixed reality display.

As mentioned above, the user can interact with the smart mirror (for example to select a button, to select a neighborhood, etc.). The user can interact with the smart mirror using one or more techniques. For example, if the smart mirror include a touchscreen, then the user can use the touch screen to provide input to the smart screen.

In another example, the smart mirror can receive voice commands. The smart mirror includes a trigger word, such as "Matilda." When the smart mirror receives the trigger word, it awaits for and responds to (i.e., takes action based on) additional commands. For example, when the smart mirror receives the command "Show me my day," the smart mirror displays the user's calendar. "Show me my meetings" causes the smart mirror to display meetings and/or events sourced from third-party calendars and social platforms. "Recommendations" or "Show me recommendations" causes the smart mirror to display recommendations received from the server in response to the command. Additional voice commands can be available, such as "Book this event," "Get my car," "Buy this outfit," or "Buy what I'm wearing." The smart mirror can integrate various voice command technology including but not limited to Siri, Alexa, and Google Assistant.

In another example, the user can use gesture. For example, using the camera, the control unit can identify user gestures. In an example, the control unit can recognize gestures that include gestures 658A-658E. The gesture 658A (swipe left and swipe right) can be used by the user to indicate "move forward" and "move backward," such as through a list. The gesture 658B is an outward facing palm placed over a selectable item on the display and followed by a closed first indicates selection. The gesture 658B is equivalent to a mouse click. The gesture 658C (two hands extended out and starting from the side at the top and outlining an hourglass) indicate "Female." The gesture 658D (two hands extended out and making the shape of a triangle) indicate "Male." The gesture 658E (two hands out and starting from the top and going down.) indicates a gender of "Other." In another example, the camera can read other hand movements. The hand movements can include one or more of sign language, custom shapes, and other movements of the hand.

In response to a command (e.g., a voice command, a gesture, a hand movement, etc.), action associated with the command can be performed. In an example, a control unit, such as the control unit 258 of FIG. 2B can perform the command. In another example, the control unit can forward the command to a server, such as the server 108 of FIG. 1, which performs the command. An output of the command can be communicated to the user via at least one of voice (via speakers of the smart mirror), written information (e.g., displayed on the monitor of the smart image), sign language and/or hand movement animations (e.g., displayed on the monitor of the smart image).

FIG. 7 are screenshots of an example of a companion application of a smart mirror according to implementations of this disclosure. A my-plans screen 702 can be used to display the user's plans as maintained by the server. A neighborhood screen 704 can be used to display a neighborhood similar to the neighborhood 620 of FIG. 6B. A paired screen 706 illustrates that the user device (e.g., the user device 106 of FIG. 1) that is executing the companion application is now paired (e.g., via Bluetooth) to the smart mirror such that, for example, music played on the user device is output via speakers of the smart mirror.

In an example of using the smart mirror system, the smart mirror can be connected to a three-dimensional printer. The user can draw (using a touch screen or using gestures) a design for a piece of clothing on the mirror of the smart mirror. The user can draw the design over the user's reflection in the mirror. The control module can use the drawn design to cause the three-dimensional printer to print the piece of clothing matching the design, which can then be worn by the user. The user can draw the design using a template as a starting point or can draw the design from scratch (i.e., without a template).

In another example of using the using the smart mirror system, the smart mirror system can be used to custom-fit clothing. For example, using the stereoscopic camera of the smart mirror, or a 360-degree camera connected to the smart mirror, a model of the shape and sizes of the user can be determined. A virtual mannequin whose dimensions fit the model of the user is created. In a virtual session between the user and a stylist (i.e., a human stylist), the stylist can show different outfits to the user by outfitting the virtual mannequin with the outfits. The user is able to judge the fit and style before making a purchasing decision.

Figure 9:
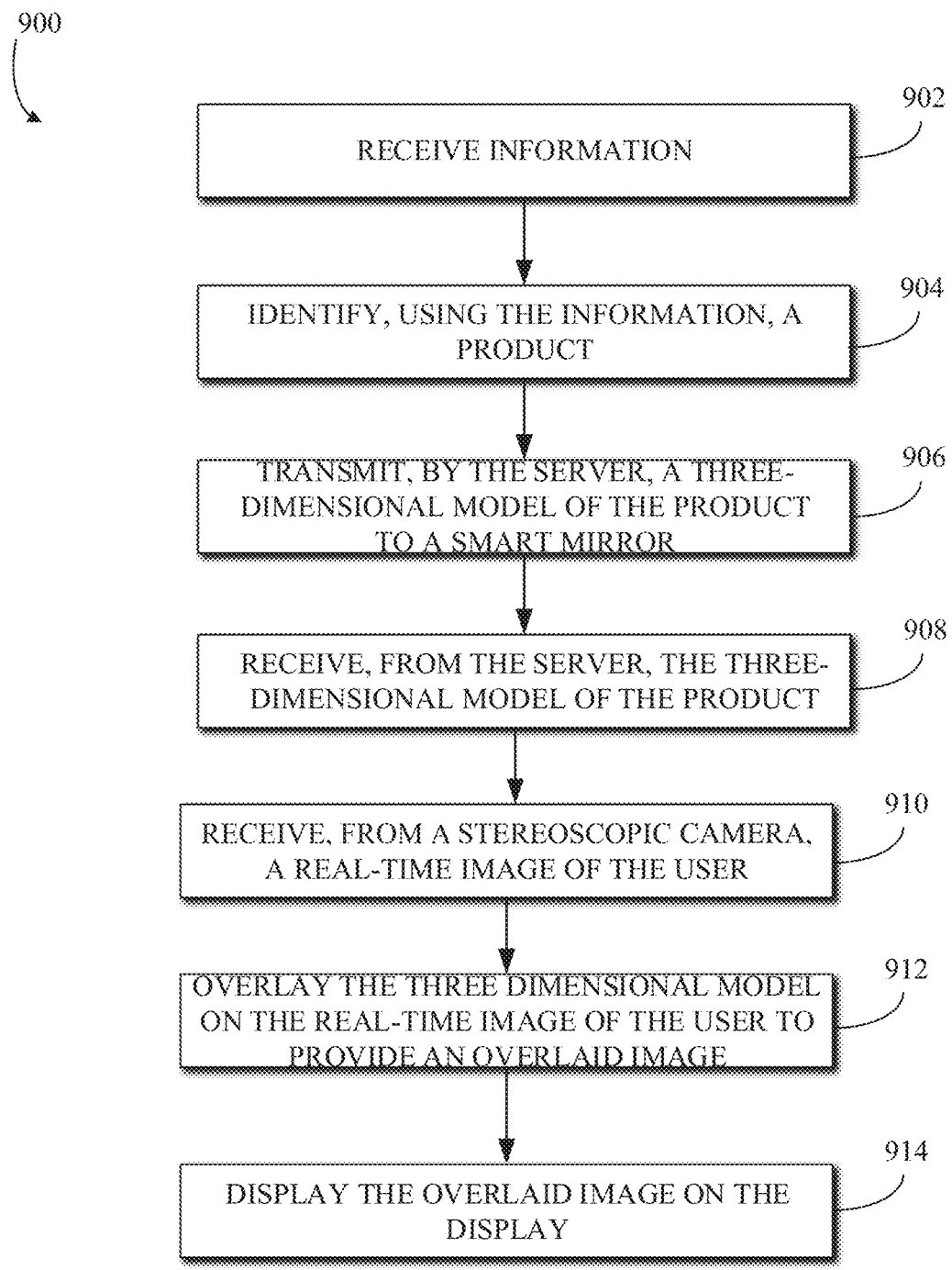
FIG. 9 is an example of a process of mixed reality display using a smart mirror system according to an implementation of this disclosure.

FIG. 9 is an example of a process 900 of mixed reality display using a smart mirror system according to an implementation of this disclosure. The smart mirror system can be as described with respect to the smart mirror system 100 of FIG. 1. The smart mirror system can include a server and a smart mirror. The server can be the server 108 of FIG. 1. The smart mirror can be the smart mirror 102 of FIG. 1. The smart mirror includes a display, such as the monitor 252 of FIG. 2B-2C or the touchscreen monitor 302 of FIG. 2. The smart mirror system can include a processor, a memory, and an application to carry out the process 900.

At 902, the smart mirror system receives information. The information can be trip information. The trip information can be received by the server. For example, the trip information can the received from the user when the user is identified by the smart mirror, as described above. For example, the trip information can be received from linked and/or synched accounts of the user. For example, the trip information can be an event that the user adds such as described with respect to FIG. 6D. For example, the trip information can be a recommended event as described with respect to FIG. 6B. As such, the trip information can be one or more events.

At 904, the smart mirror system identifies, using the information (e.g., the trip information) an object or product for the user. The product can be an outfit. The identification of the product can be based solely on the trip information. For example, the outfit is identified as described above with respect to fashion recommendations. The outfit can be identified by the server. The identified outfit can be an outfit that is selected by the user to try on.

At 906, the smart mirror system, via the server, transmits a three-dimensional model of the product (e.g., outfit) to the smart mirror. At 908, the smart mirror system, via the smart mirror, receives the three-dimensional model of the product. At 910, the smart mirror system (more specifically, a control unit of the smart mirror such as the computing device 308 of FIG. 3) receives, from the camera (e.g., a stereoscopic camera), a real-time image of the user. By real-time image is meant that the image is received contemporaneously with the user standing in front of the mirror as the user is standing in front of the mirror. At 912, the smart mirror system, via the smart mirror, overlays the three-dimensional model of the product on the real-time image of the user to provide an overlaid image. At 914, the smart mirror system, via the smart mirror, displays the overlaid image on the display.

In an implementation, the process 900 includes receiving, via the stereoscopic camera, a command from the user. For example, the user can perform a gesture that the smart mirror interprets as a command. The command can be related to the product. For example, the command can be to add the product (e.g., outfit) to a shopping bag. For example, the command can be to try on an outfit or an item of clothing. The command is then transmitted by the smart mirror to the server.

In an implementation, the trip information for the user includes a calendar event entry. The calendar event entry includes a time of day and a location. In an implementation, identifying the outfit for the user includes identifying the outfit based on the time of day and the location.

In an implementation, displaying the overlaid image on the display includes displaying a mashup that includes the overlaid image, an image of the location, and weather information at the time of day, as described above. The overlaid image can be overlaid on an image of the location. In an example, the image of the location can be a real-time video image of the location. In an example, the image can be a cinematography that includes a current location of the smart mirror and the location.

For simplicity of explanation, the process 900 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 10:
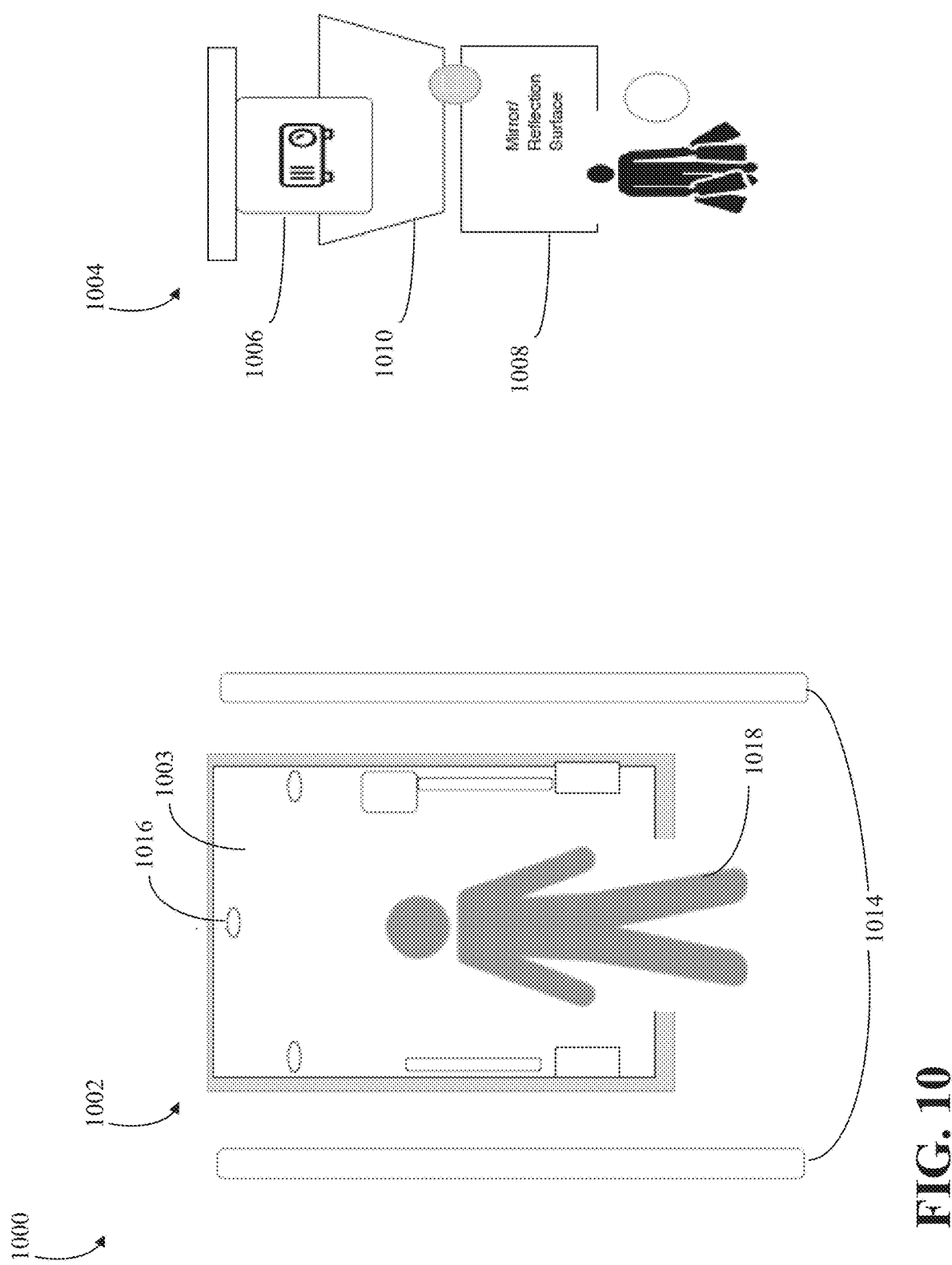
FIG. 10 illustrates an example of using a smart mirror system so that a user seems to be in two places at once.

FIG. 10 illustrates an example 1000 of using a smart mirror system so that a user seems to be in two places at once. For example, and using the recommendations of the business screen 672 of FIG. 6D, the user can try on a recommended outfit and see herself in the recommended outfit at the recommended restaurant (i.e., "The Standard Grill").

The example 1000 includes a first location 1002 and a second location 1004. The first location 1002 can be, for example, a location where a smart mirror 1003 is installed, such as a hotel room, the user's residence, or the like. The second location 1004 can be a location (e.g., a venue, a restaurant, a store, etc.). At the second location 1004, a projector 1006 (e.g., a high-definition projector) projects an image of a user 1018 from the first location 1002 onto a reflective surface 1008. The reflected image bounces onto a sheet 1010. The sheet 1010 can be a polyester film or can be a plastic sheet. The sheet 1010 can be overlaid on the floor of the second location 1004 at an angle (e.g., a 45-degree angle) so that it is invisible to the audience at the second location 1004. The projection at the second location 1004 can be triggered when a motion is detected at the first location 1002.

At the first location 1002, a camera array 1014 is used to create a 360-degree view of the user 1018. The camera array 1014 can be used to capture the whole of the user 1018 through the smart mirror 1003. As such, the camera array 1014 can scan the user 1018 from head to toe. The camera array 1014 can also be 360 cameras. The camera array 1014 can capture real time movement and interactions of the user 1018. The images acquired by the camera array 1014 are stitched into one view. The camera array 1014 can be cameras with at least 4K shooting resolution per 30 frames per second.

A camera 1016 at the first location 1002 is used to identify the user and rig the user's body and image as described above. The stitched and rigged image can be transmitted, for example, via the server (e.g., the server 108 of FIG. 1) to projector 1006 at the second location 1004. As such, the user 1018 can appear to be at two places: at the first location 1002 and at the second location 1004 in the environment of the second location 1004. In an example, the user can be outfitted with a recommended outfit when the user is displayed at the second location 1004.

Cameras (not shown) at the second location 1004 can send a live stream of the second location 1004 to the smart mirror 1003 such that the smart mirror 1003 can display the streamed view of the second location 1004 onto the background of the display of the smart mirror 1003. As such, the user 1018 at the first location 1002 can view the real environment of the second location 1004 and interact with it. The projected user can pretend to talk and motion to items at the second location 1004. Controls and interactive buttons on the smart mirror 1003 allow the user 1018 to interact with the real world at the second location 1004.

Figure 11:
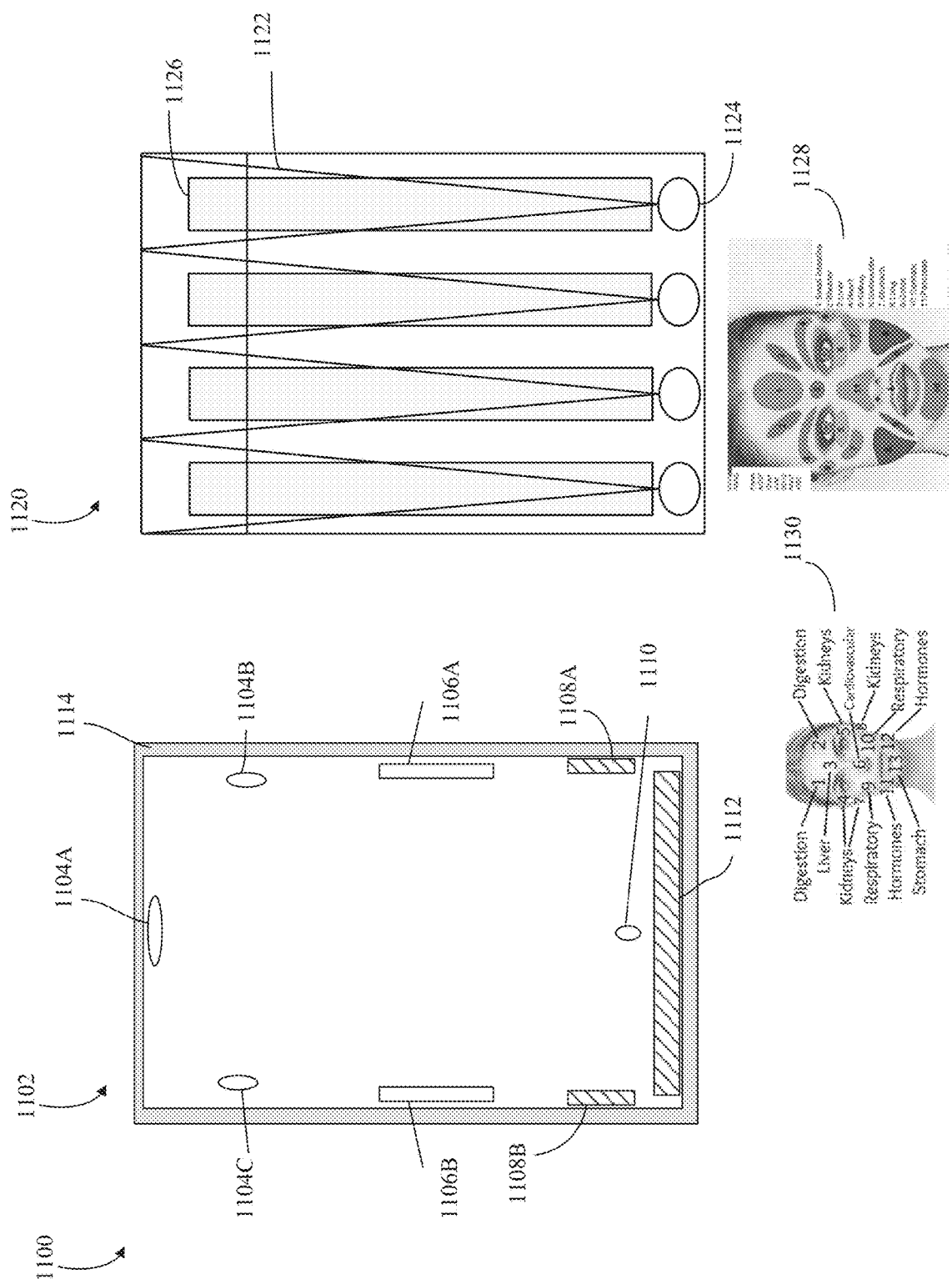
FIG. 11 illustrates an example of a smart mirror used as a medicine cabinet and/or bathroom cabinet.

FIG. 11 illustrates an example of a smart mirror 1100 used as a medicine cabinet and/or bathroom cabinet. The smart mirror 1100 shows a front side 1102 and a back side 1120. The smart mirror 1100 can be used to dispense substance, such as a lotion as described below. The dispensed substance is tailored (i.e., personalized) to the user's current conditions (e.g., circles around eyes, stress level, skin breakout, etc.). For example, the smart mirror 1100 can mix the appropriate amounts of the constituent ingredients (e.g., water, a lotion, a moisturizer) of a dispensed substance such that the mixed solution (i.e., the dispensed substance) is optimized to the user's current conditions (e.g., physical or emotional) and specific make up of the user's skin. That is, by analyzing the face and/or skin of the user, the smart mirror 1100 can dispense a substance that is based on a recipe that is specific to the user. As such, the smart mirror can function equivalently to a 3D printer: the smart mirror determines a recipe (i.e., quantities for each substance) and dispenses a substance according to the recipe. In an example, the amount or volume of a substance to dispense can be determined using light (e.g., the array of sensor lights 1126), sound, scale and/or images of the container 1122.

The front side 1102 includes, a camera 1104 (herein, three cameras 1104A-C are shown), light strips 1114 that can be disposed between an outer edge of the mirror and an enclosure of the smart mirror 1100, an array of microphones 1106A disposed at the right side of the smart mirror 1100, an array of microphones 1106B disposed at the right side of the smart mirror 1100, a speaker 1108A disposed at the right side, a speaker 1108B disposed at the left side, and a motion sensor 1110. The smart mirror 1100 also includes a dispenser 1112, which is further explained with respect to the back side 1120.

Via voice commands and/or gestures, a user can provide inputs and commands to the smart mirror 1100. The smart mirror 1100 can set the lighting of the light strips 1114 based on preferences of the user. The smart mirror 1100 can display, on the display of the smart mirror 1100, information including weather information and a view of the user's events for the day. More generally, the information displayed is information that is relevant to the user. The information is at the right place and right time, and for the right vibe. The smart mirror 1100 can play music, stream news, play videos, and remind the user of a time to leave in order to timely arrive at a next appointment.

The control unit of the smart mirror 1100 can analyze images from the cameras 1104A-C to diagnose the user's skin, face and body. The user's health profile can be sent, for example, to a doctor, a nutritionist, or a trainer.

The smart mirror 1100 can use images from the camera(s) to perform face mapping. For example, the smart mirror 1100 can use face mapping to diagnose reasons for acne in the user's face and display notifications on the display of the smart mirror 1100 regarding the causes of identified acne. In an example, pore size, dryness, fatigue, redness, more, less or other face mappings can be used to diagnose the reasons for acne. The notification can be, for example, text or graphical message and/or augmented reality messages overlaid on the user's face and/or body parts. For example, if acne is identified in zones 1 or 2, as shown in map 1128, then the smart mirror 1100 can display a message to the user that the user should hydrate. In another example of face mapping, corners and points on user's face can be detected to output characteristics and traits using a map 1130.

The back side 1120 illustrates an example where a lotion (e.g., the dispensed substance) to be dispensed is composed of four main ingredients. Each ingredient is included in a container 1122—four containers are shown in the back side 1120. Each container 1122 is connected to a respective stopper and dispenser 1124. Each container 1122 is monitored by a respective array of sensor lights 1126. The array of sensor lights 1126 can be used by the control unit of the smart mirror 1100 to measure quantity and volume of each dispensed substance and to measure remaining quantity in each container 1122.

A motor and/or pressure can be used to dispense a substance from its respective container 1122 when the user needs the substance. The motion sensor 1110 (e.g., detecting that the user has placed his or her hands under the dispenser 1112) or a button on the display can cause substance to be dispensed. Calculation of the amount of substance to dispense (e.g., duration of actuation of motors) can be made using the shape and size of the container 1122 and how much was previously dispensed. In another example, measurement of light, camera images and sensors can be used to determine volume. The smart mirror 1100 can send information regarding amounts of substances dispensed and/or user health conditions can be sent to the server.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for augmented reality display using a smart mirror system, comprising:
   a server; and
   a smart mirror, comprising:
   a display; and
   a camera,
   wherein the server is configured to:
   receive information associated with a user, the information comprising a calendar event entry;
   identify, using the calendar event entry, a suggested calendar event comprising event location information;
   select, using the event location information, an image of a location;
   identify, using the event location information, an object for the user; and
   transmit, to the smart mirror, a three-dimensional model of the object, the suggested calendar event, and the image of the location; and
   wherein the smart mirror is configured to:
   receive, from the server, the three-dimensional model of the object, the suggested calendar event, and the image of the location;
   receive, from the camera, a real-time image of the user;
   overlay the three-dimensional model of the object on the real-time image of the user to provide an overlaid image;
   underlay the image of the location under the overlaid image and under the real-time image of the user to provide an under laid image; and
   display the overlaid image, the under laid image, and the suggested calendar event on the display.

2. The system of claim 1, wherein the smart mirror is configured to:
   receive, via the camera, a command from the user, the command being related to the object; and
   transmit the command to the server.

3. The system of claim 1, wherein the calendar event entry comprises a time of day.

4. The system of claim 3, wherein to identify the object for the user comprises to: identify the object based on the time of day and the event location information.

5. The system of claim 3, wherein to display the overlaid image on the display comprises to: display a mashup comprising the overlaid image, and weather information at the time of day.

6. The system of claim 1, wherein the image of the location is a real-time video of the location.

7. The system of claim 1, wherein the image of the location is a cinematography that includes a current location of the smart mirror and the location.

8. The system of claim 1,
   wherein the server is further configured to:
   maintain a user's calendar; and
   receive the calendar event entry from the user's calendar.

9. The system of claim 1,
   wherein the server is further configured to:
   link to a third-party calendar provider; and
   receive the calendar event from the third-party calendar provider.

10. The system of claim 1, wherein the smart mirror is configured to provide a user interface for selecting the suggested event.

11. The system of claim 1,
    wherein the smart mirror is further configured to:
    move and reorient the three-dimensional model of the object to follow movements of the real-time image of the user to provide the overlaid image.

* * * * *